United States Patent
Abu El Ata et al.

(10) Patent No.: US 7,035,786 B1
(45) Date of Patent: Apr. 25, 2006

(54) SYSTEM AND METHOD FOR MULTI-PHASE SYSTEM DEVELOPMENT WITH PREDICTIVE MODELING

(76) Inventors: Nabil A. Abu El Ata, 1820 S. 181st, Omaha, NE (US) 68130; Peter M. Zelechoski, 7808 N. 216th St., Elkhorn, NE (US) 68022

(*) Notice: Subject to any disclaimer, the term of this patent is extended or adjusted under 35 U.S.C. 154(b) by 803 days.

(21) Appl. No.: 10/005,481

(22) Filed: Oct. 26, 2001

Related U.S. Application Data

(63) Continuation-in-part of application No. 09/127,191, filed on Jul. 31, 1998, now Pat. No. 6,311,144.

(60) Provisional application No. 60/085,350, filed on May 13, 1998.

(51) Int. Cl.
*G06F 13/10* (2006.01)

(52) U.S. Cl. .............................. 703/21; 718/102; 703/2

(58) Field of Classification Search .................. 703/1, 703/2, 14, 21; 717/101, 110, 135; 364/468.03; 718/102; 709/224; 750/7; 702/84
See application file for complete search history.

(56) References Cited

U.S. PATENT DOCUMENTS

| | | | |
|---|---|---|---|
| 5,146,591 A | 9/1992 | Bachman et al. | 395/600 |
| 5,193,183 A | 3/1993 | Bachman | 395/600 |
| 5,195,178 A | 3/1993 | Krieger et al. | 395/157 |
| 5,208,765 A * | 5/1993 | Turnbull | 702/84 |
| 5,233,513 A * | 8/1993 | Doyle | 705/7 |
| 5,241,645 A | 8/1993 | Cimral et al. | 395/500 |
| 5,276,877 A | 1/1994 | Friedrich et al. | 709/105 |
| 5,297,279 A | 3/1994 | Bannon et al. | |
| 5,446,874 A | 8/1995 | Waclawsky et al. | 714/1 |
| 5,486,995 A | 1/1996 | Krist et al. | 364/149 |
| 5,522,014 A | 5/1996 | Clark et al. | 706/45 |
| 5,539,652 A * | 7/1996 | Tegethoff | 703/14 |
| 5,680,590 A | 10/1997 | Parti | 395/500 |
| 5,724,556 A | 3/1998 | Souder et al. | 395/500 |
| 5,724,569 A | 3/1998 | Andres | 395/602 |
| 5,726,914 A | 3/1998 | Janovski et al. | 702/84 |
| 5,729,746 A * | 3/1998 | Leonard | 717/101 |
| 5,771,370 A | 6/1998 | Klein | 395/500.34 |
| 5,790,789 A | 8/1998 | Suarez | 709/202 |
| 5,801,958 A | 9/1998 | Dangelo et al. | 364/489 |
| 5,809,282 A | 9/1998 | Cooper et al. | 709/226 |
| 5,822,749 A | 10/1998 | Agarwal | |
| 5,881,268 A * | 3/1999 | McDonald et al. | 703/21 |
| 5,893,074 A | 4/1999 | Hughes et al. | 705/8 |
| 5,937,165 A * | 8/1999 | Schwaller et al. | 709/224 |
| 5,953,707 A | 9/1999 | Huang et al. | 705/10 |
| 5,958,009 A | 9/1999 | Friedrich et al. | 709/224 |
| 5,984,511 A | 11/1999 | Vasey-Glandon et al. | 364/512 |
| 5,999,734 A | 12/1999 | Willis et al. | 395/706 |
| 6,003,079 A | 12/1999 | Friedrich et al. | 709/224 |
| 6,009,256 A | 12/1999 | Tseng et al. | 395/500 |

(Continued)

OTHER PUBLICATIONS

Rolia et al., "The method of layers", IEEE 1995.*

(Continued)

*Primary Examiner*—Paul L. Rodriguez
*Assistant Examiner*—Kandasamy Thangavelu
(74) *Attorney, Agent, or Firm*—Hamilton, Brook, Smith & Reynolds, P.C.

(57) ABSTRACT

Information system designs and prototype implementation generated through one or more design and construction phases are validated utilizing predictive modeling. Design validation ensures that the design satisfies a set of performance requirements at each design phase, while validation of prototype implementation ensures the prototype behaves in conformance to the predictive model.

24 Claims, 18 Drawing Sheets

U.S. PATENT DOCUMENTS

| | | | |
|---|---|---|---|
| 6,023,706 | A | 2/2000 | Schmuck et al. |
| RE36,602 | E * | 3/2000 | Sebastian et al. ....... 364/468.03 |
| 6,038,540 | A | 3/2000 | Krist et al. ..................... 705/8 |
| 6,067,412 | A * | 5/2000 | Blake et al. ................. 718/102 |
| 6,115,718 | A | 9/2000 | Huberman et al. |
| 6,119,125 | A | 9/2000 | Glouderman et al. |
| 6,145,121 | A * | 11/2000 | Levy et al. .................. 717/135 |
| 6,272,507 | B1 | 8/2001 | Pirolli et al. |
| 6,311,144 | B1 * | 10/2001 | Abu El Ata .................... 703/2 |
| 6,327,551 | B1 * | 12/2001 | Peterson et al. ............... 703/1 |
| 6,370,681 | B1 * | 4/2002 | Dellarocas et al. ......... 717/110 |
| 6,532,465 | B1 | 3/2003 | Hartley et al. |
| 6,560,569 | B1 * | 5/2003 | Abu El Ata .................... 703/2 |
| 2001/0041996 | A1 | 11/2001 | Eder |
| 2004/0128618 | A1 | 7/2004 | Datta |
| 2004/0138933 | A1 * | 7/2004 | LaComb et al. ................ 705/7 |
| 2004/0167765 | A1 * | 8/2004 | Abu El Ata .................. 703/22 |

OTHER PUBLICATIONS

"BMC Software BEST/1," http://www.bgs.com (Updated: Apr. 10, 1998), 1 pg.

"About BEST/1," http://www.bgs.com/bgs.htm (Printed Out: May 21, 1998) 1 pg.

"BMC Software to Acquire BGS Systems," http://www.bgs.com/bmcbgs.htm (Printed Out: May 21, 1998), 3 pgs.

"Peformance and Capacity Management, BEST/1-Visualizer for AS/400," http://www.bgs.com/as400/as4_home.htm (Printed: May 21, 1998), 2 pgs.

"BEST/1-Visualizer for AS/400, Product Description," http://www.bgs.com/as400/Slid_2.html (Printed Out: May 21, 1998), 2 pgs.

"BEST/1-Visualizer for AS/400, Bottleneck Detection and Analysis," http://www.bgs.com/as400/Slid_3.html (Updated: Nov. 22, 1996), 2 pgs.

"BEST/1-Visualizer for AS/400, Threshold Exception Reporting," http://www.bgs.com/as400/Slid_4.html (Updated: Jan. 23, 1997), 2 pgs.

"BEST/1-Visualizer for AS/400, Track and Trend Long-term Performance," http://www.bgs.com/as400/Slid_6.html (Printed Out: May 21, 1998) 2 pgs.

"BEST/1-Visualizer for AS/400, CPU/System Graphs," http://www.bgs.com/as400/Slid_8.html (Updated: Nov. 29, 1996, 2 pgs.

"BEST/1-Visualizer for AS/400, I/O Subsystem Graphs," http://www.bgs.com/as400/Slid_9.html (Updated Nov. 30, 1996), 2 pgs.

"BEST/1-Visualizer for AS/400, Storage Pool Graphs," http://www.bgs.com/as400/Slid_11.html (Updated: Nov. 22, 1996), 2 pgs.

"BEST/1-Visualizer for AS/400, Communication Line Graphs," http://www.bgs.com/as400/Slid_12.html (Updated: Nov. 30, 1996), 2 pgs.

"BEST/1-Visualizer for AZ/400, Job Graphs," http://www.bgs.com/as400/Slid_13.html (Updated: Jan. 22, 1997) 2 pgs.

"The Portable Simulation Initiative and the Common Modeling Framework," http://www.ses.com/psi-cmf.html (Updated: Apr. 3, 1998), 3 pgs.

"SES—Products and Services: Why Simulate?" http://www.ses.com/whysimulate.html (Updated: Apr. 2, 1998), 7 pgs. from *Capacity Management Review*, vol. 36, No. 2, Feb., 1998.

"SES in the Press," http://www.ses.com/news/html (Updated: Apr. 8, 1998), 3 pgs.

"SES Inc. Announces Release of Strategizer," http://www.ses.com/pr_archive/010297.html (Updated: Jul. 14, 1997, 2 pgs.

"SES Releases SES/Workbench 3.1," http://www.ses.com/pr_archive/022896.html (Updated Jul. 14, 1997), 3 pgs.

"SES/workbench: Workbench Overview," http://www.ses.com/workbench.html (Updated: Feb. 10, 1998), 3 pgs.

"SES/objectbench: Batch Execution," http://www.ses.com/Objectbench/sim_details_batch.html (Updated: Apr. 6, 1998), 2 pgs.

"SES/objectbench: The Objectbench Animated Simulator," http://www.ses.com/Objectbench/simulator.html (Updated: Apr. 15, 1998), 2 pgs.

"SES/objectbench," http://www.ses.com/Objectbench/index.html (Updated Apr. 6, 1998), 2 pgs.

EETimes: Intel, Others Eye Performance Modeling Standard, http://www.techweb.com/se/directlink.cgi?EET19971103S0105 (Nov. 3, 1997), 2 pgs.

"Euroexpert: GATE$^{TN}$," Euroexpert SA, Antony, France (Sep. 1, 1997), 2 pgs.

"Euroexpert: Best Practices: Milan Stock Exchange," Euroexpert SA, Antony, Fanece (Sep. 1, 1007), 2 pgs.

"Euroexpert: Best Practices: France Telecom," Euroexpert SA, Antony, France (Sep. 1, 1997), 2 pgs.

"Simulation modeling within workflow technology," Miller, et al., Proceedings of the 1995 Winter Simulation Conference, Dec. 3-6, 1995.

"Analyzing and re-engineering business process using simulation," Bhskar, et al., Proceedings of the 1994 Winter Simulation Conference, Dec. 11-14, 1994.

"BEST/1-Visualizer for AS/400, Workload Analysis," http://www.bgs.com/as400/Slid_5.html (Updated: Jan. 23, 1997), 2 pgs.

Gunther, N., "The Practical Performance Analyst", *Performance-by-Design Techniques for Distributed Systems*, McGraw-Hill, Table of Contents only consisting of 9 pages, 1998.

"Model Driver Architecture (MDA) Document No. ormsc/2001-07-01", Architecture Board ORMSC[1], pp. 1-31, Jul., 2001.

Grady, R., et al., "Software Metrics: Establishing A Company-Wide Program", Prentice-Hall, Inc., Table of Contents only, consisting of 5 pgs., 1987.

Rechtin, E., "System Architecting", *Creating and Building Complex Systems*, Prentice Hall, 1991, Table of Contents only, consisting of 5 pages.

Booch, G., et al., "The Unified Modeling Language User Guide", Addison Wesley Longman, Inc. 1999, Table of Contents only, consisting of 9 pages.

Humphrey, W., "Managing the Software Process", SEI Series in Software Engineering, Addison-Wesley, 1990, Table of Contents only, consisting of 7 pages.

Boehm, B., "Software Engineering Economics," Prentice Hall, 1981, Table of Contents only, consisting of 14 pages.

Soley, R., et al., "Model Driven Architecture," *Object Management Group*, pp. 1-12 (Nov. 27, 2000).

Hutchins, G., "ISO 9000, A Comprehensive Guide to Registration, Audit Guidelines, and Successful Certification" (Oliver Wight Publications, Inc.) 1993, Table of Contents Only consisting of 5 pages.

Lazowska, E., et al., "Quantitative System Performance: *Computer System Analysis Using Queueing Network Models*", Prentice-Hall, Inc., 1984, Table of Contents Only consisting of 8 pages.

Beck, K., "Extreme Programming Explained", Addison-Wesley 2000, Table of Contents Only consisting of 7 pages.

Sarris, D., et al., "The White Papers: *Capacity Planning for e-Commerce Systems With Benchmark Factory*™", http://www.quest.com/whitepapers/cap_plan_Ecomm.pdf, pp. 1-19. No date given.

Leymann, F., et al, "Production workflow: concepts and techniques", 2000, Table of Contents Only consisting of 14 pages.

"PYRAMID: Quantitative management: get a grip on software!" 100 pages, 1991.

Shaw, M., et al., "Software Architecture: *Perspectives on an Emerging Discipline*", Prentice Hall 1996, Table of Contents only consisting of 7 pages.

"EuroExpert GATE™ MODEL Product Description, *A predictive approach to efficient information systems*", pp 1-21, 1994.

White, R.V., "An Introduction to Six Sigma with a Design Example," *Applied Power Electronics Conference and Exposition, 1992. Conference Proceedings 1992, Seventh Annual*, Feb. 23-27, 1992, pp. 28-35.

"Euroexpert—Best Practices: French Social Security—UNEDIC", http://www.accretivetechnologies.com/documents/UNEDIC,PDF, Euroexpert and Gate (TM), 1992 Best Practices.

Ata, N., "How we Avoided Murphy's Law at the Italian Stock Exchange", CMG 1997, consisting of 7 pages.

Ata, N., "How Metrics and Models Made Architecture Real," presented at DCI Conference in Washington, D.C. in Feb., 2000 (slides 1-21).

Ata, N., "A Predictive Modeling Approach to Developing Complex Systems," presented at CSC Leading Edge Forum Conference on Mar. 6, 2001 (slides 1-35).

Menasce, D., et al., "Capacity Planning and Peformance Modeling," 1994, Prentice-Hall, ISBN 0-13-035494-5.

Agrawal, S., et al., "The aggregate server method for analyzing serialization delays in computer systems", ACM Transactions on Computer Systems, vol. 1, Issue 2, pp. 116-143, May 1983, ISSN: 0734-2071.

Compaq Open VMS Documentation, "TCP/IP Networking on Open VMS Systems", Nov. 1996, URL: http://www.openvms.compaq.com:8000/ssb71/6436p.htm.

Altmann, M., "A list of software for computer simulations", Last updated: Nov. 11, 1996. URL: http://www.nmsr.labmed.umn.edu/~michael/dbase/outgoing/FAQ.html.

Keshav, S., "Real 5.0 Overview", Aug. 13, 1997, URL: http://www.cs.cornell.edu/skeshav/real/overview.html.

Keshav, S., "Real 5.0 User Manuel", Aug. 13, 1997, URL: http://www.cs.cornell.edu/skeshav/real/user.html.

Keshav, S., "Real 5.0 Programmer's Manual", Aug. 13, 1997, URL: http://www.cs.cornell.edu/skeshav/real/prog.html.

Keshav, S., "Real 5.0 Changes", Aug. 13, 1997, URL: http://www.cs.cornell.edu/skeshav/real/changes.html.

Keshav, S., "Real 4.0 Programmer's Manual", Oct. 21, 1993, URL: http://minnie.cs.adfa.oz.au/REAL/prog.asc.gz.

Keshav, S., "Real 4.0 User's Manual", Oct. 21, 1993, URL: http://minnie.cs.adfa.oz.au/REAL/user.asc.gz.

Choukri, T., "cv_choukuri.htm", 1999. URL: http://www.global-coms.com/consultants/cv_choukuri.htm.

US. Trademark Electronic Search System, search result for Trademark Serial No. 74555204. Nov. 27, 2001.

Ata, N., "A Predictive Modeling Approach to Developing Complex Systems", CSC Leading Edge Forum, Mar. 6, 2001, URL: http://www2.csc.com/lef/programs/forum/mar_01.htm.

Ata, N., "System Performance Modeling", ITC Meeting Minutes, Dec. 2, 1999, URL: http://www.istis.unomaha.edu/itc/meetings/m991202.htm.

Ata, N., "CMG97 Session Descriptions by Subject Area", CMG97 Orlando, The Computer Measurement Group's 1997 Int'l Conference, Dec. 7-12, 1997, URL: http://www.cmg.org/cmg97/cmg97sessions.html and http://www.cmg.org/cmg97/97Workload.pdf.

* cited by examiner

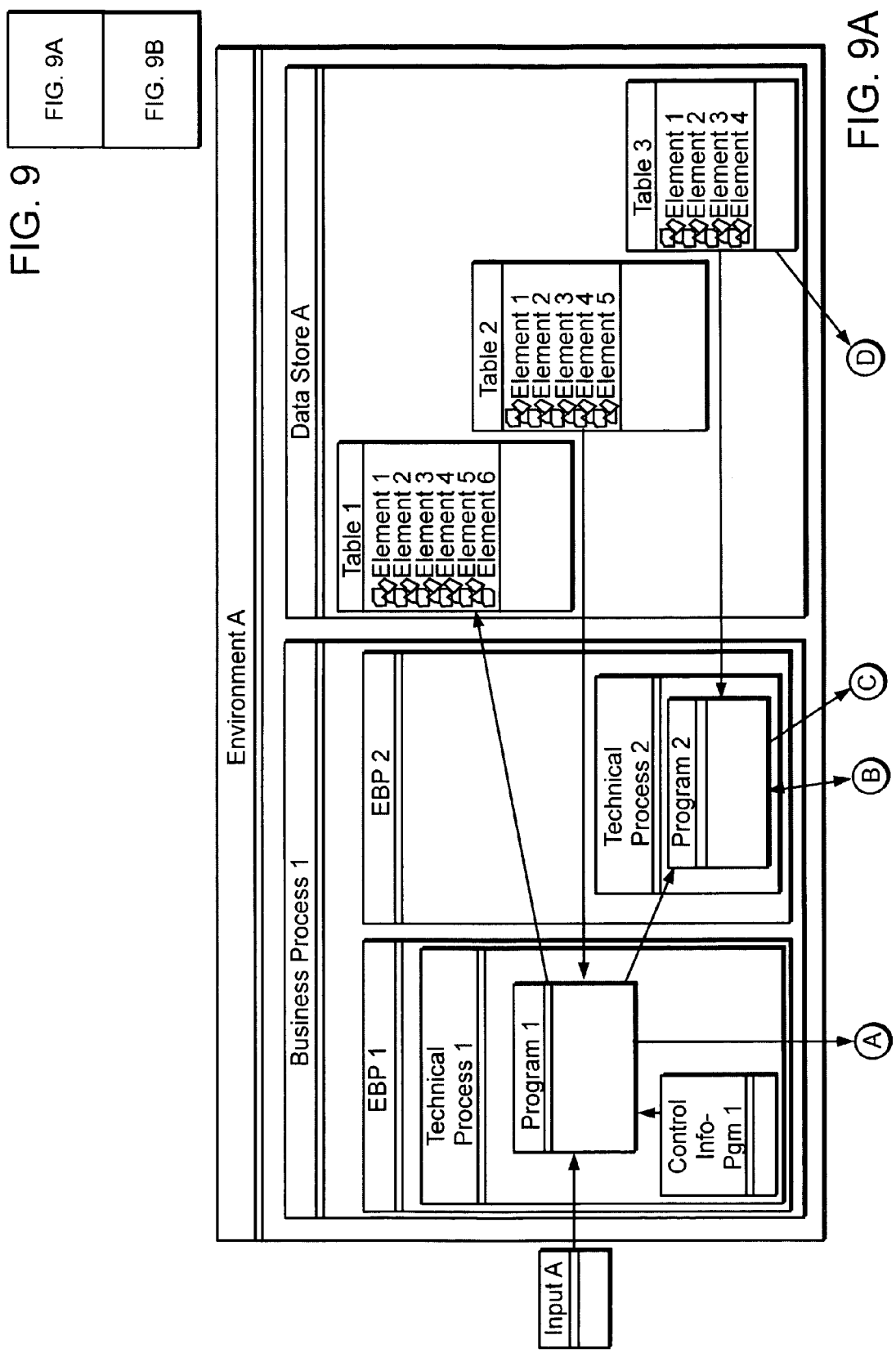

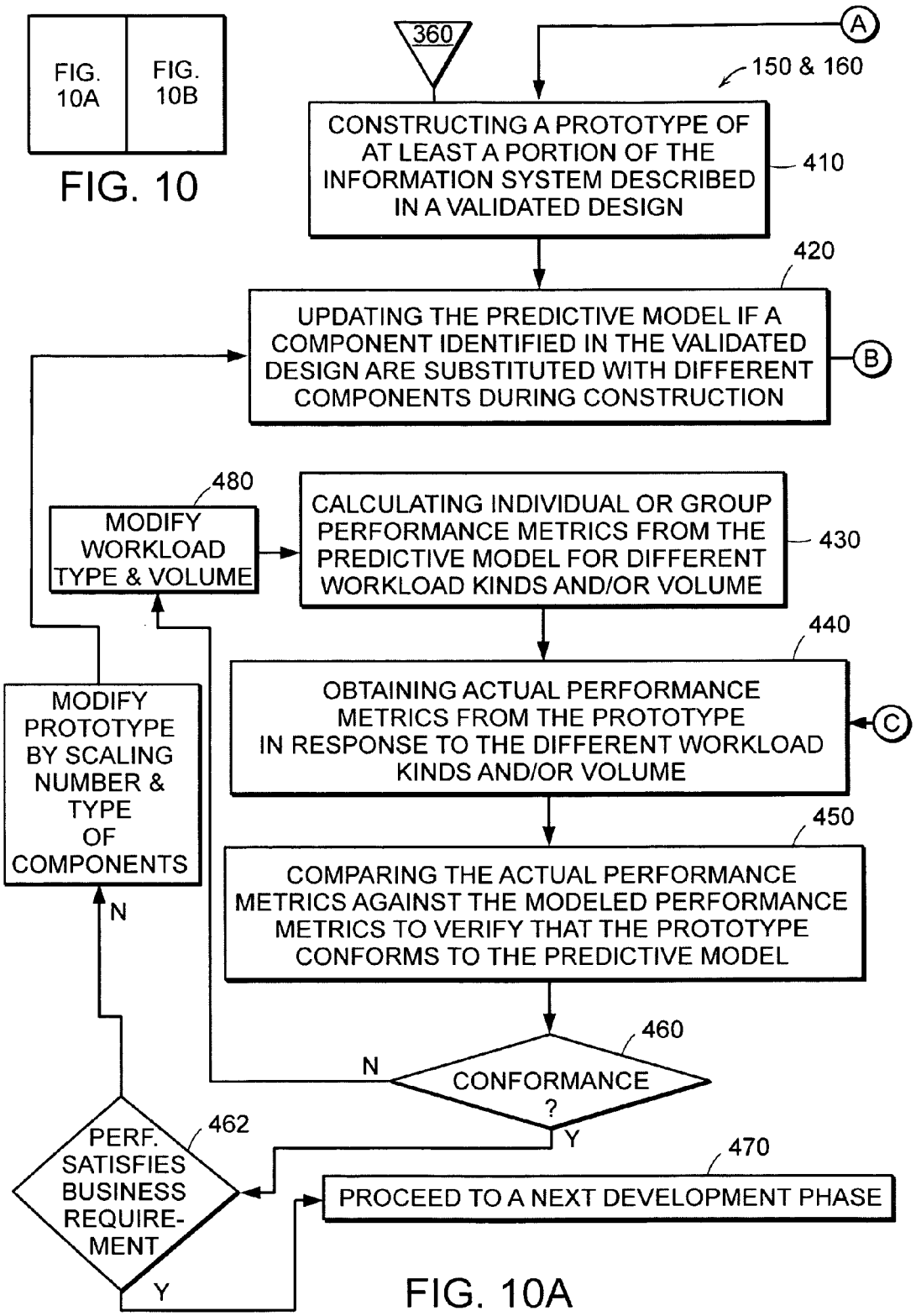

SYSTEM AND METHOD FOR MULTI-PHASE SYSTEM DEVELOPMENT WITH PREDICTIVE MODELING

RELATED APPLICATIONS

This application is a continuation-in-part of application Ser. No. 09/127,191, filed Jul. 31, 1998, currently issued as U.S. Pat. No. 6,311,144 which claims the benefit of U.S. Provisional Application No. 60/085,350, filed on May 13, 1998. The entire teachings of the above applications are incorporated herein by reference.

BACKGROUND OF THE INVENTION

With the advent of electronic computing, business organizations have deployed computerized information systems to provide time-critical, cost-efficient business solutions. Information systems typically include various software applications distributed across one or more hardware/network operating environments.

In developing such systems, traditional system engineering involves multiple development phases, including a requirements phase, an architecture design phase, a construction phase, and a deployment phase. During the design phases, static descriptions and assumptions about hardware and software component behavior and characteristics are relied on for developing the system architecture of the information system.

However, in deployed systems, the characteristics and behavior associated with individual hardware and software components are dynamic. Thus, the information system as a whole is also associated with dynamic characteristics and behavior. Changes in workload and hardware and software interactions typically have a significant effect on system performance.

With traditional system engineering, dynamic characteristics and behavior are not addressed until late in the development process, if at all, where the improvement possibilities are more limited. Thus, there is no guarantee that an information system, once deployed, will satisfy current and future business requirements, such as business-critical response time and throughput.

Furthermore, problem isolation and debugging becomes more complicated, resulting in increased development costs and time. In particular, if the origin of a problem resides in the business or architecture design itself, the cost of improvement may become prohibitive without partial or full redesign. Thus, with traditional system engineering, it is difficult, if not impossible, to guarantee the deployment of complex business information systems within time and budget constraints having required performance and operating costs.

SUMMARY OF THE INVENTION

Embodiments of the present invention provide a system and method for developing an information system through multiple development phases interleaved with a predictive modeling phase. At one or more design phases, a performance metric calculation module calculates performance metrics from a predictive model of an information system design.

A construction module, in turn, validates the information system design by comparing the calculated performance metrics against a set of predefined performance requirements, ensuring that the design satisfies the set of performance requirements at each design phase.

If the design satisfies the performance requirements, development may proceed to further development phases. Conversely, if the design does not satisfy the set of performance requirements, the design may be modified. According to one embodiment, the design may be modified by scaling the number or kind of components of the design.

After modifying the design, the performance metric calculation module calculates updated performance metrics from a predictive model of the modified design. The construction module, in turn, validates the modified design by comparing the updated performance metrics against the performance requirements, ensuring that the modified design satisfies them. If the modified design is validated, development may proceed to a further development phase.

At one or more construction phases, the performance metric calculation module calculates performance metrics from a predictive model of a validated information system design. The performance metrics may be calculated for different workload types or volume. A prototype of at least a portion of the information system is constructed from the validated design. The prototype is then validated by comparing the calculated performance metrics against actual performance metrics obtained from the prototype, ensuring the prototype conforms to the predictive model.

If the actual performance metrics substantially match the calculated performance metrics, development may proceed to further development phases. Otherwise, the prototype may be modified, such that the actual performance metrics conform to the calculated performance metrics of the predictive model.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIGS. 9A and 9B are parts of a diagram illustrating a technical architecture design

DETAILED DESCRIPTION OF THE INVENTION

A description of preferred embodiments of the invention follows.

Business solutions involve interactions among business components, including business workloads, business processes, and data stores, to solve the needs of business entities. Generally, the design of such information systems are constrained by a set of business requirements, which predefine certain performance criteria to make the business solution acceptable. Information systems implement business solutions by providing a technical infrastructure that supports the business workload, business processes, and data storage requirements of the solution.

Figure 1:
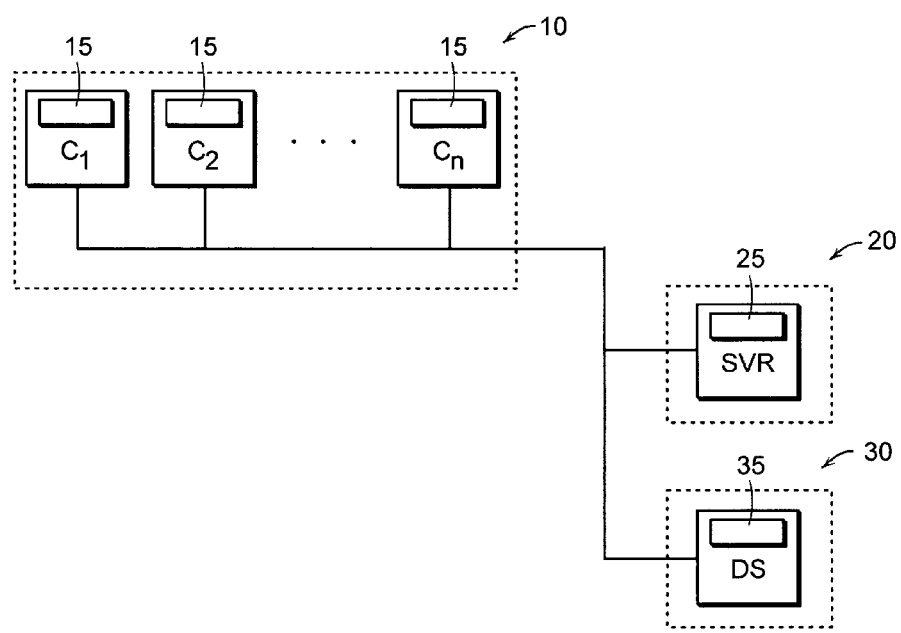
FIG. 1 is a diagram of a simple information system implementing a business solution according to one embodiment of the present invention.

FIG. 1 is a diagram of a simple information system implementing a business solution according to one embodiment of the present invention. An information system typically includes a system architecture with software application components distributed across system hardware and system networking components. Referring to FIG. 1, the information system includes client computers, $c_1$ through $c_n$, executing a data processing client application 15 for implementing the input and output of business workload 10; a server, SVR, executing a data processing server application 25 for implementing a business process 20; and a data store, DS, executing a data based management application 35 for implementing data storage functionality 30. However, most information systems are much more complex, including a large number of distributed applications, client terminals, servers, data stores, internetworking infrastructure, and a variety of networked peripheral devices.

In designing and implementing information systems, traditional system engineering typically proceeds through several development phases from conception through deployment. However, there are no checkpoints to determine whether the design or implementation will satisfy a set of predefined business or technical performance criteria. Without such predictive assessment, a significant amount of time and investment may be wasted in developing information systems that may not be able to satisfy the business requirements within time and budget constraints.

For example, with respect to FIG. 1, it is difficult, if not impossible, to guarantee the response time and throughput of this design. Depending on the expected business workload, this design may need additional server capacity to satisfy its business and performance requirements, thereby increasing the cost of development. If such design and implementation modifications are realized earlier in the development process, a significant amount of time and investment may be saved.

Embodiments of the present invention provide a system and method for multi-phased system development of information systems utilizing predictive modeling to validate the design and construction of an information system at each phase of development. Such embodiments provide early detection of unacceptable designs and implementations early in the development lifecycle, avoiding significant losses in investment. According to one embodiment, predictive modeling may be implemented as described in U.S. patent application Ser. No. 09/127,191, filed Jul. 31, 1998, entitled "Method and Apparatus for Designing and Analyzing Information Systems Using Multi-Layer Mathematical Models", the entire contents and teachings of which are incorporated herein by reference. However, further embodiments of predictive modeling known to those skilled in the art may also be employed.

Further embodiments of the invention provide a system and method for improving the accuracy of predictive modeling of an information system by modeling a dynamic representation of the business solution and through automated calibration of a predictive model against predefined performance benchmarks. With improved predictive modeling capacity, confidence may be instilled in a particular design or implementation.

The input module 46 receives input 42 from an input device, a network, or a storage device. The input 42 includes a description for a proposed information system in varying degree of detail. In one embodiment, the input 42 is descriptive input that provides a complete description of the business processes within the organization, and is not limited to computer transactions or processes. In another embodiment, the input 42 also includes non-computer transactions such as paper transactions that do not occur on a computer, and even verbal transactions or processes that occur between people.

The input module 44 receives input 42 from an input device, a network, or a storage device. The input 42 includes a description for a proposed information system in varying degree of detail. In one embodiment, the input 42 is descriptive input that provides a complete description of the business processes within the organization, and is not limited to computer transactions or processes. In another embodiment, the input 42 also includes non-computer transactions such as paper transactions that do not occur on a computer, and even verbal transactions or processes that occur between people.

Generally, the input module 46 passes on data to the construction module 48, and the data is processed by the construction module 48, resulting in a predictive model 50 of the information system. The predictive model 50 is a quantitative model of the proposed information system created by the construction module 48 based on the descriptive input 42. The construction module 48 then passes the model 50 on to the performance metric calculation module 54 for further processing and then to the output module 56. The output module 56 provides output 58 to an output device, a network, or a storage device. In one embodiment, the output module provides the output 58 to a display device for the designer of the information design system 40. For more information regarding multi-layer predictive modeling, refer to U.S. patent application entitled "Method and Apparatus for Designing and Analyzing Information Systems Using Multi-Layer Mathematical Models", the entire contents and teachings of which are incorporated herein by reference.

Figure 3:
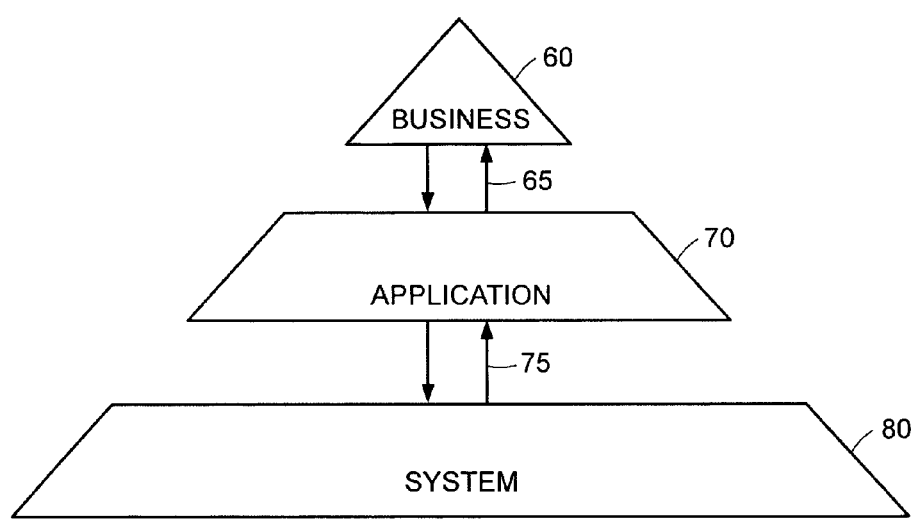
FIG. 3 is a conceptual diagram of a multi-layer predictive model according to one embodiment of the present invention.

FIG. 3 is a conceptual diagram of a multi-layer predictive model according to one embodiment of the present invention. Using a combination of deterministic and probabilistic mathematics, a multi-layer predictive model expresses the dynamic characteristics and behavior of a proposed information system from three or more perspectives, including a business layer 60, an application layer 70, a system layer 80, and, optionally, a data layer (not shown). Through a system of equations, each layer models the dynamic characteristics and behavior of its components individually and collectively in terms of probabilities for delays, conflicts, contentions, and locks. Each layer may have an effect on the dynamic characteristics and behavior expressed in the other layers, as indicated by arrows 65 and 75. Each layer may include further sublayers to provide additional levels of granularity to the predictive model.

According to one embodiment, the business layer 60 models the dynamic characteristics and behavior of business processes, data stores, and business I/O workloads. The application layer 70, in turn, models the dynamic characteristics and behavior of application software components supporting the business components of the business layer 60. Information from the business layer 60, such as business workload, may affect the expression of the models in the application layer 70. For example, a single interaction between business components in the business layer 60 may correspond to two requests and responses between corresponding application components in the application layer 70.

The system layer 80, in turn, models the dynamic characteristics and behavior of hardware and network components that provide a system infrastructure for distributing the application software components of the application layer 70. Information from the application layer, such as application workload, may affect the expression of the models in the system layer 80. For example, an application request in the application layer 70 may correspond to 4 CPU and 20 I/O transactions in the system layer 80.

With a multi-layer predictive model of an information system, performance metrics may be generated for each component, for each layer, and for the information system in general from the probabilities calculated from the predictive model for delays, conflicts, contentions, and locks.

Figure 2:
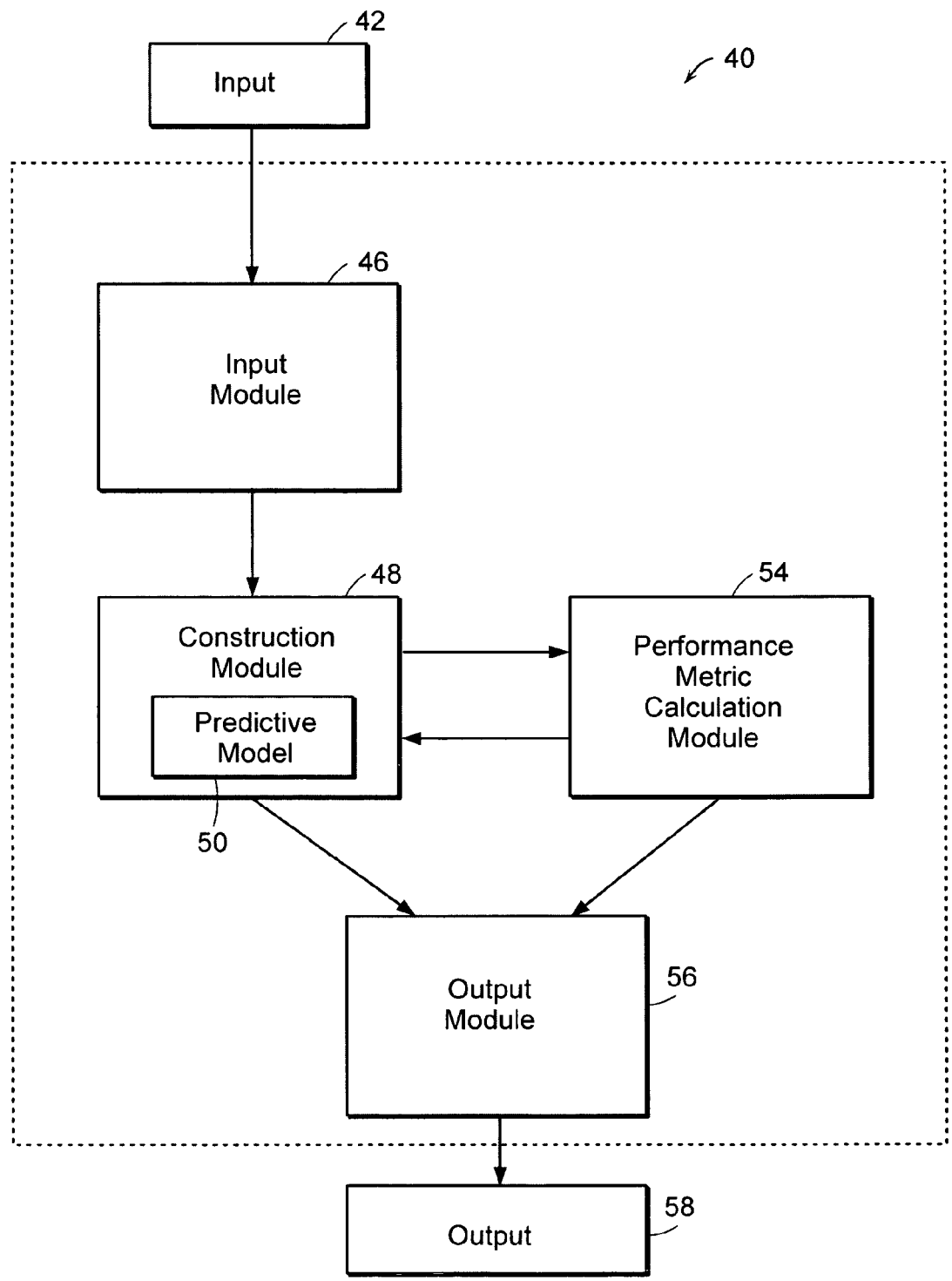
FIG. 2 is a diagram illustrating the components of a system that generates a multi-layer predictive model according to one embodiment of the present invention.
Figure 4A:
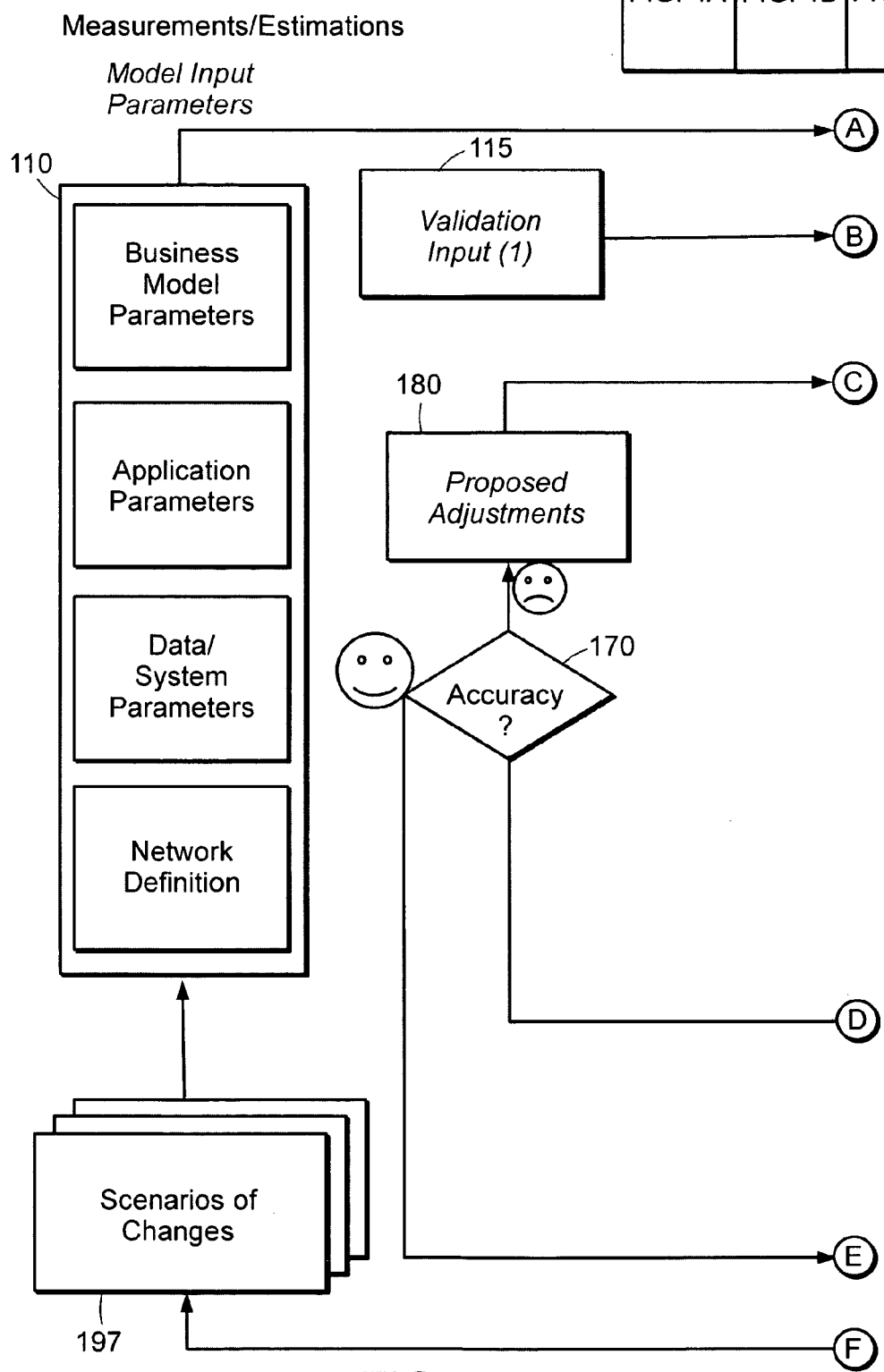
FIGS. 4A, 4B and 4C are parts of a flow diagram of multi-layer predictive modeling
Figure 4B:
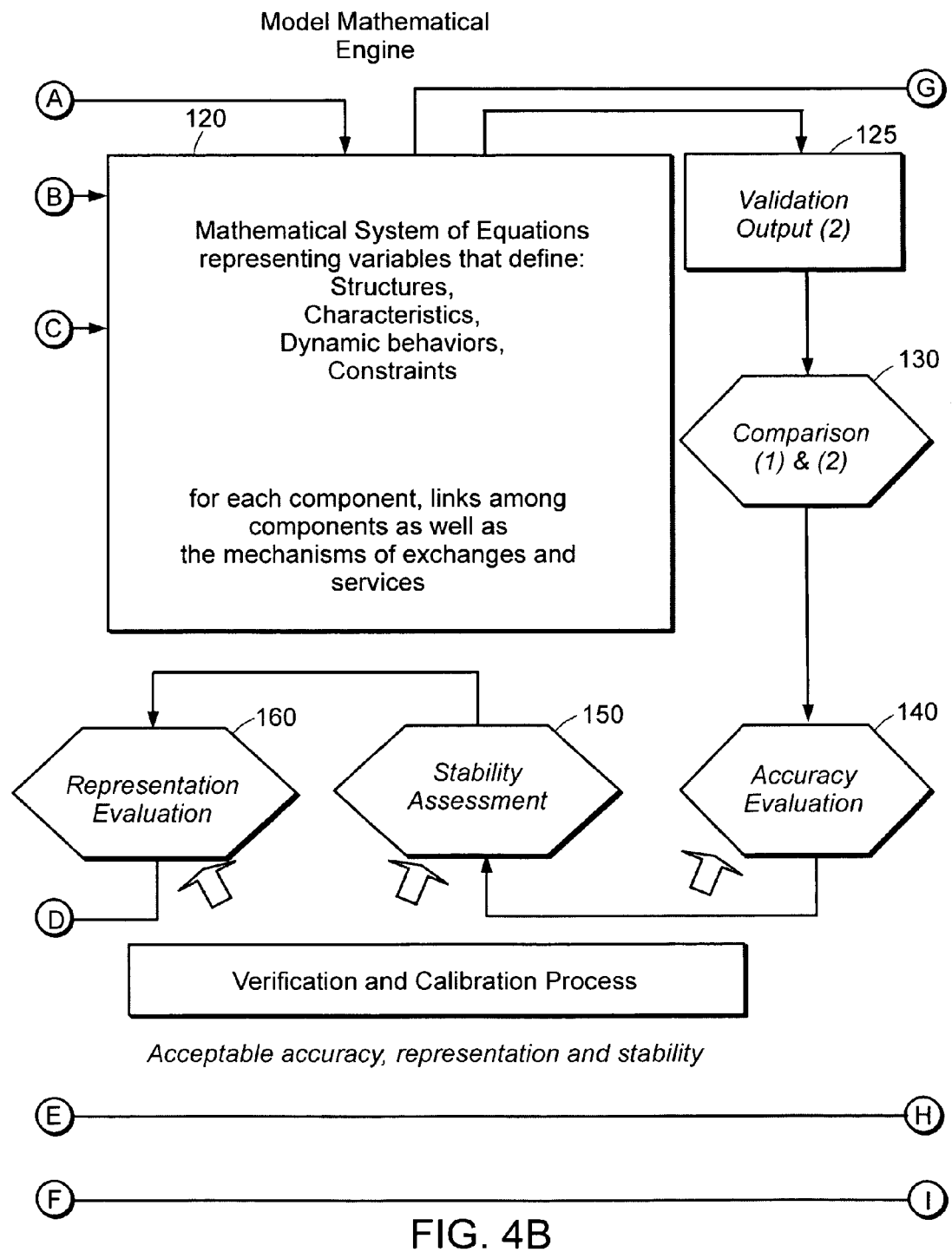
Figure 4C:
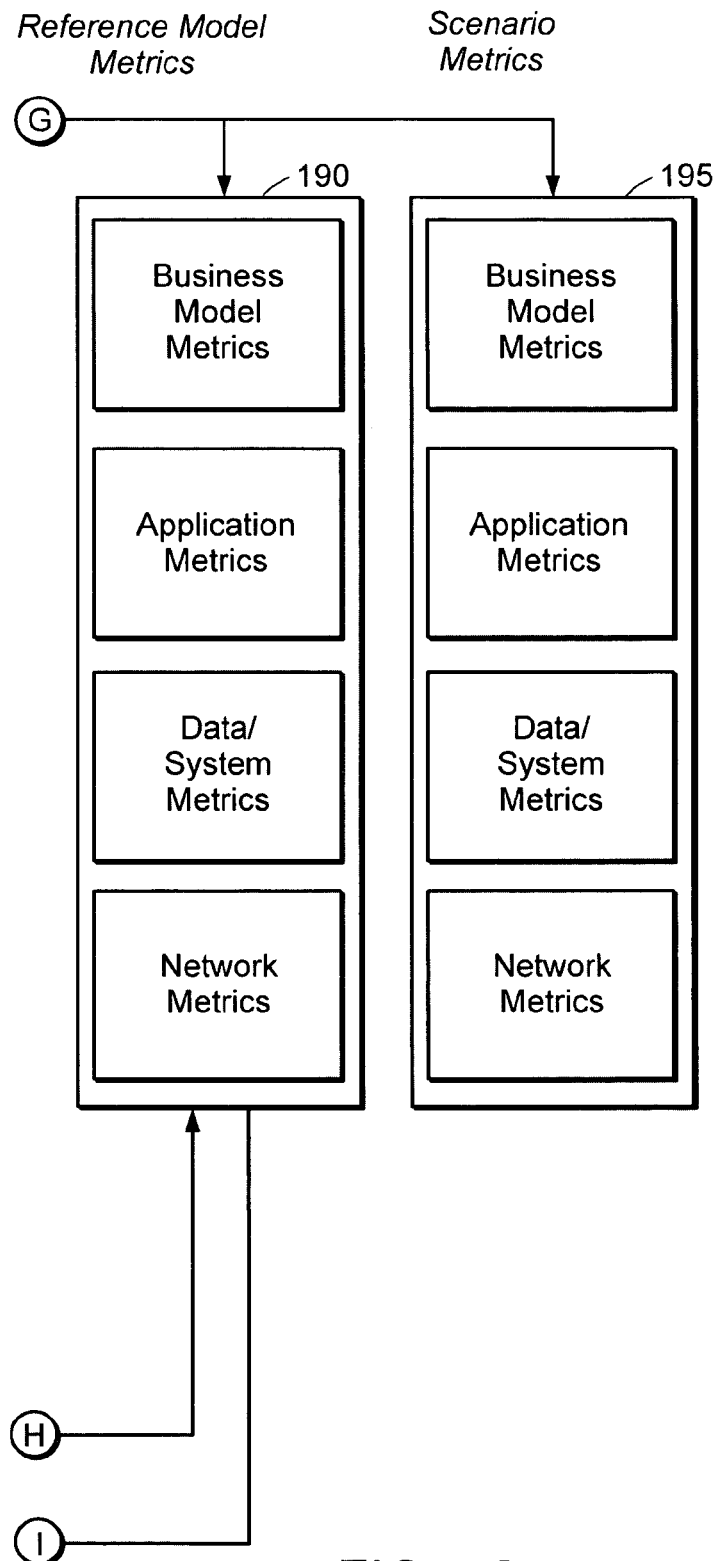

FIG. 4 is a flow diagram of multi-layer predictive modeling according to one embodiment of the present invention. According to one embodiment, one or more sets of model input parameters 110 are derived by the input module 46 (FIG. 2) from a description of an information system design. The model input parameters 110, in turn, are used by a construction module 48 in order to generate the predictive model 50 as a system of equations 120 representing the system, layer, and component probabilities related to a dynamic characteristic or behavior. A performance metric calculation module 54 calculates performance metrics, referred to as Validation Output 125, using the probabilities calculated from the predictive model 50.

According to one embodiment, the system of equations 120 is expressed as follows:

$$P = \Sigma_i A_1 P_1(S_1) \Pi C_{j,m} P_{j,m}(S_{j,m}) \tag{1}$$

As previously stated, the system of equations 120 is used to generate probabilities associated with a particular performance metric, such as response time and throughput. Referring to equation (1), P is the general probability associated with the overall information system for a particular performance metric. The probability P is calculated from the sum of the probabilities $P_1(S_i)$ calculated for each layer i (e.g., 1=business layer 60, 2=application layer 70, 3=system layer 80). For each layer i, the probability $P_1(S_i)$ is calculated from the product of the probabilities $P_{j,m}(S_{j,m})$ calculated for each component in that layer. $P_{j,m}(S_{j,m})$ is a mathematical expression of any form expressing the probability of the performance metric occurring within a component.

With respect to the probability equation $P_{j,m}(S_{j,m})$ for a component, subscript 'j' identifies the component, while subscript 'm' represents the states of services provided by a component. For example, a component j can be operated in one or more modes of operation (e.g., batch, transactional, query-based), the value of 'm' indicates the mode of operation in use. Each equation $P_{j,m}(S_{j,m})$ may include terms which may be enabled and disabled by the value of 'm'.

$A_1$ is a parameter representing the workload associated with layer i and may depend on the workload associated with another layer (e.g., $A_2$ being a function of $A_1$). Similarly, $C_{j,m}$ is a parameter representing the workload associated with component j. The value of $C_{j,m}$ may be a percentage of the workload $A_1$. For example, if $A_i$ is equal to 100 and represents the total number of stock-related requests, workload $C_{1,m}$ to a seller handling business process may be equal to 40% of $A_1$, representing the dynamic number of seller stock requests. Similarly, workload $C_{2,m}$ to a buyer handling business process may be equal to 60% of $A_1$, representing the dynamic number of buyer stock requests. It may also take into account data from one or more of the previous layers. Parameters $A_1$ and $C_{j,m}$ may be adjusted during model calibration, which is described in more detail with reference to FIG. 13. The solution of the system of equations will determine all values of these constants that, in turn, are used to calculate the modeled output performance metrics.

This three level modeling of FIGS. 3 and 4 allows the computation of both the service time and response time for a path as well as the service time and response time spent in each component on the path. The two metrics will permit the assessment of the performance potential of a design by assessing each of them differently. The service time translates the residence time of the path if no wait is exercised (i.e. no contention, or conflict for resources). If such time is unacceptable, a re-engineering of the architecture or another design could become the only way to improve the situation. If the service time on the other hand is acceptable but the response time is not, this means that the waiting portion of the response time is unacceptable and only an optimization process might be required, including hardware upgrade. With such approach, one might use this process to determine if an architecture or a design will operationally be able to fulfill the business need or another alternative might exist to improve the implementation while it is still possible, and definitely prior to any investment. The architecture and design improvement process of the present invention will be simply performed through the computation of different scenarios of change of the original model until satisfactory values of performance metrics are obtained.

Figure 5:
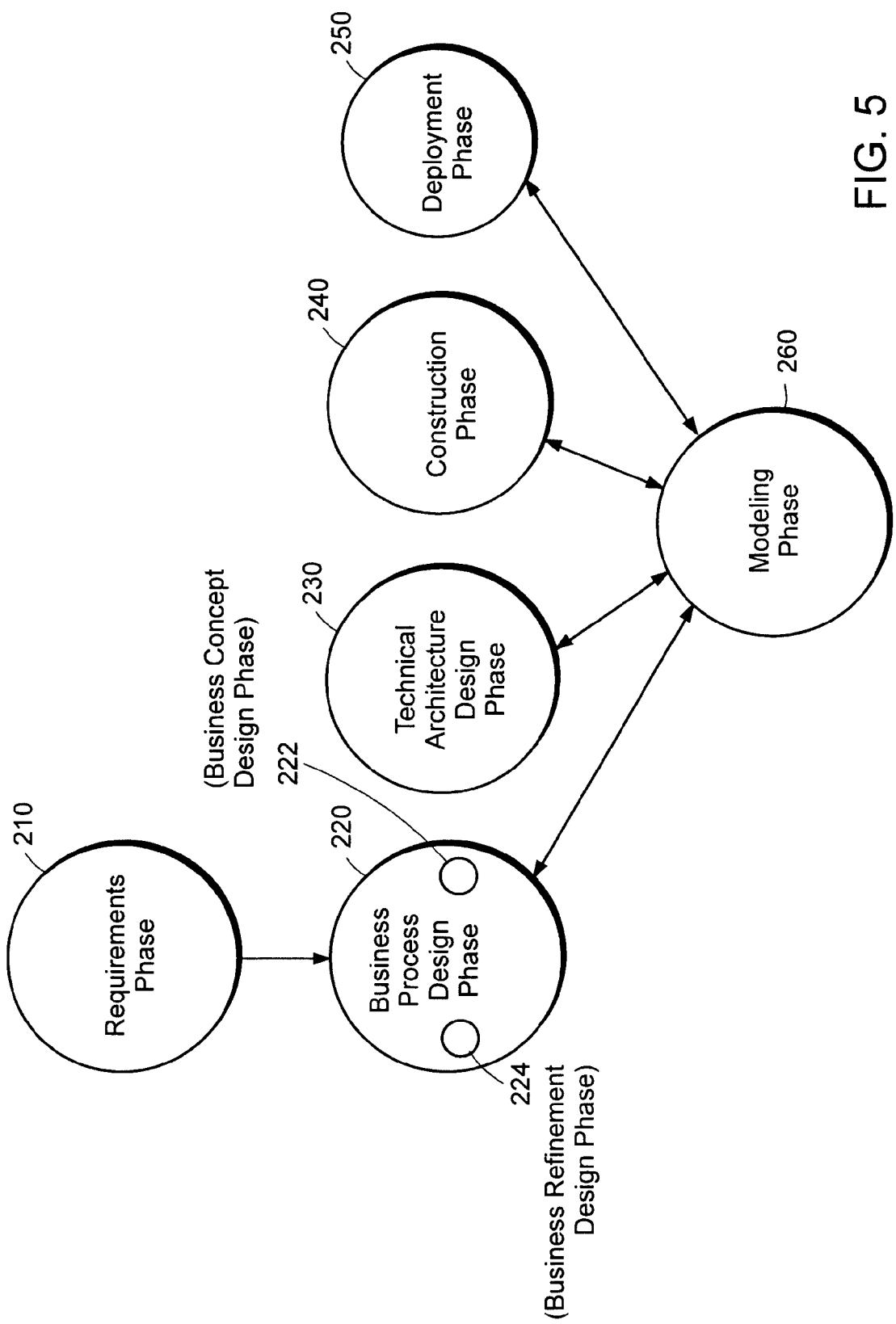
FIG. 5 is a flow diagram illustrating a sequence of development phases interleaved with a predictive modeling phase according to one embodiment of the present invention.

FIG. 5 is a flow diagram illustrating a sequence of development phases interleaved with a predictive modeling phase according to one embodiment of the present invention. The system development phases, as illustrated, include one or more requirements phases 210, one or more business process design phases 220, one or more technical architecture design phases 230, one or more construction phases 240, one or more deployment phases 250, and one or more predictive modeling phases 260, which follow the techniques of FIGS. 3 and 4 discussed above.

During the predictive modeling phase 260, the design or implementation of an information system resulting from a development phase 220, 230, 240, 250 is validated prior to proceeding to further development phases. Thus, predictive modeling ensures that the designs resulting from the design phases satisfy a predefined set of business or technical requirements. Likewise, predictive modeling ensures that the implementations of the information system or portions thereof conform to modeled characteristics and behavior. If a design or implementation is not satisfactorily validated during the predictive modeling phase 260, the design or implementation is modified addressing the problems which prevent it from being validated. Thus, system behavior and performance is known at each phase of development prior to and through deployment of the information system.

During the requirements phase 210, requirements for the business solution are obtained from a variety of sources, including organizational departments within a business entity and its customers. These requirements define the criteria for successful implementation of a business solution, such as business-critical response times and throughput. Furthermore, these requirements express the business characteristics, drivers, and constraints, driving the need and design of a business solution, enhancement, or replacement.

According to one embodiment, the design phases may include a business concept design phase 222, a business refinement design phase 224, and a technical architecture design phase 230. By validating the designs resulting from each phase through predictive modeling, a thorough understanding of the capabilities of the entire information system is achieved and adjustments may be incorporated before investing significantly in an unacceptable design.

Figure 6:
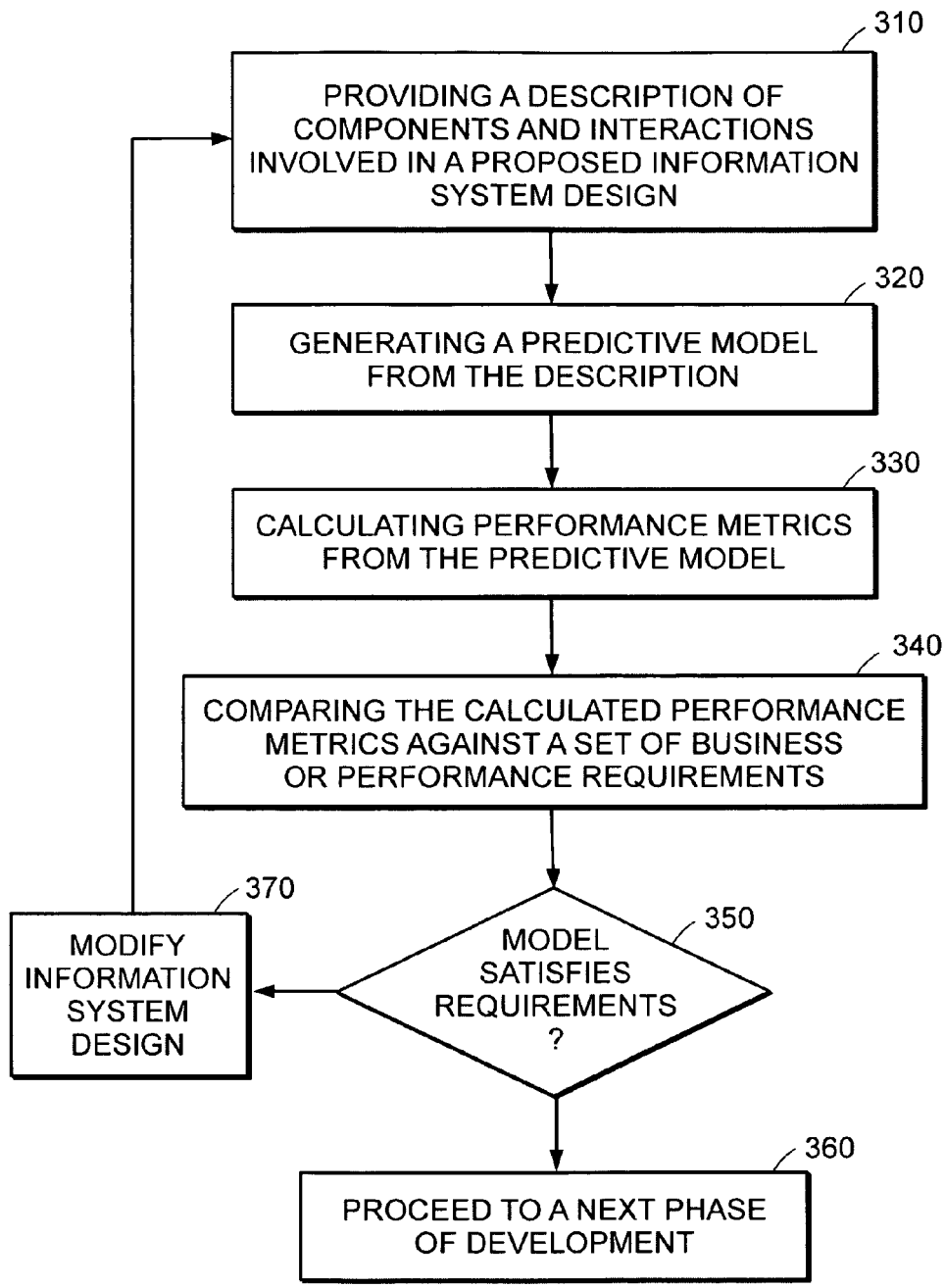
FIG. 6 is a flow diagram illustrating a process for validating a proposed information system design resulting from a design phase according to one embodiment of the present invention.

FIG. 6 is a flow diagram illustrating a process for validating a proposed information system design resulting from a design phase according to one embodiment of the present invention.

At 310, a description of components and interactions involved in a proposed information system design is provided. According to one embodiment, the proposed design may be input using a Unified Modeling Language (UML) tool, such as Rational Rose®, or another tool of like capability and exported into a format describing the design.

At 320, a predictive model 50 is generated from the description. According to one embodiment, the description is converted into a set of model input parameters 110 that are used to generate a system of equations 120 representing the dynamic characteristics and behaviors of components individually and collectively through one or more layers 60, 70, 80 of the predictive model 50. The values of the model input parameters 110 may be used for populating the equations as parameters, selecting model equations, or enabling terms within a model equation.

At 330, a performance metric calculation module 54 calculates performance metrics 125 from the predictive model 50. In particular, the performance metric calculation module 54 solves the system of equations 120 from the predictive model 50, resulting in probabilities for dynamic characteristics and behavior, such as delays, conflicts, constraints, and contentions. These probabilities, in turn, are utilized in calculations for various performance metrics, such as those described in more detail in U.S. patent application Ser. No. 09/127,191. The performance metrics may be calculated individually or collectively and are output at 125 in FIG. 4.

At 340, the performance metrics 125 calculated from the predictive model 50 are compared against a set of business or performance requirements illustrated as Validation Input 115 (FIG. 4). According to one embodiment, the comparison is a simple difference operation. Other comparators 130 are suitable.

At 350, if the calculated performance metrics 125 from the predictive model 50 satisfy the requirements 115, then the design at this design phase is validated and may proceed to a next phase of development at 360. Alternatively, the validated design may be further analyzed from a cost perspective to determine whether the design is profitable before proceeding to a next phase.

Conversely, at 350, if the modeled and calculated performance metrics 125 do not satisfy the set of performance requirements 115, the process proceeds to 370 where the design is modified addressing the problems preventing the design from validation. For example, if the instant design is unable to handle an expected workload within an acceptable response time, additional capacity (i.e., number of business, application, and/or system components) may be needed. Likewise, one or more components may be substituted in the design of the information system with different kinds of components that may have more appropriate dynamic characteristics and behavior.

In some instances, the components causing negative performance results are provided additional services, such as security, reliability, modifiability, serviceability, and portability, enhancing the quality and robustness of the information system. Thus, the calculated performance metrics 125 may be used as an indicator to evaluate tradeoffs involved in maintaining such services. If having such services is more important than performance, then the design may be acceptable even if the system performs at a lesser efficiency.

Once the design is modified at 370, the process returns back to 310 where an updated description of the proposed information system is provided for the validation process of FIG. 6 to validate the design again.

Figure 7:
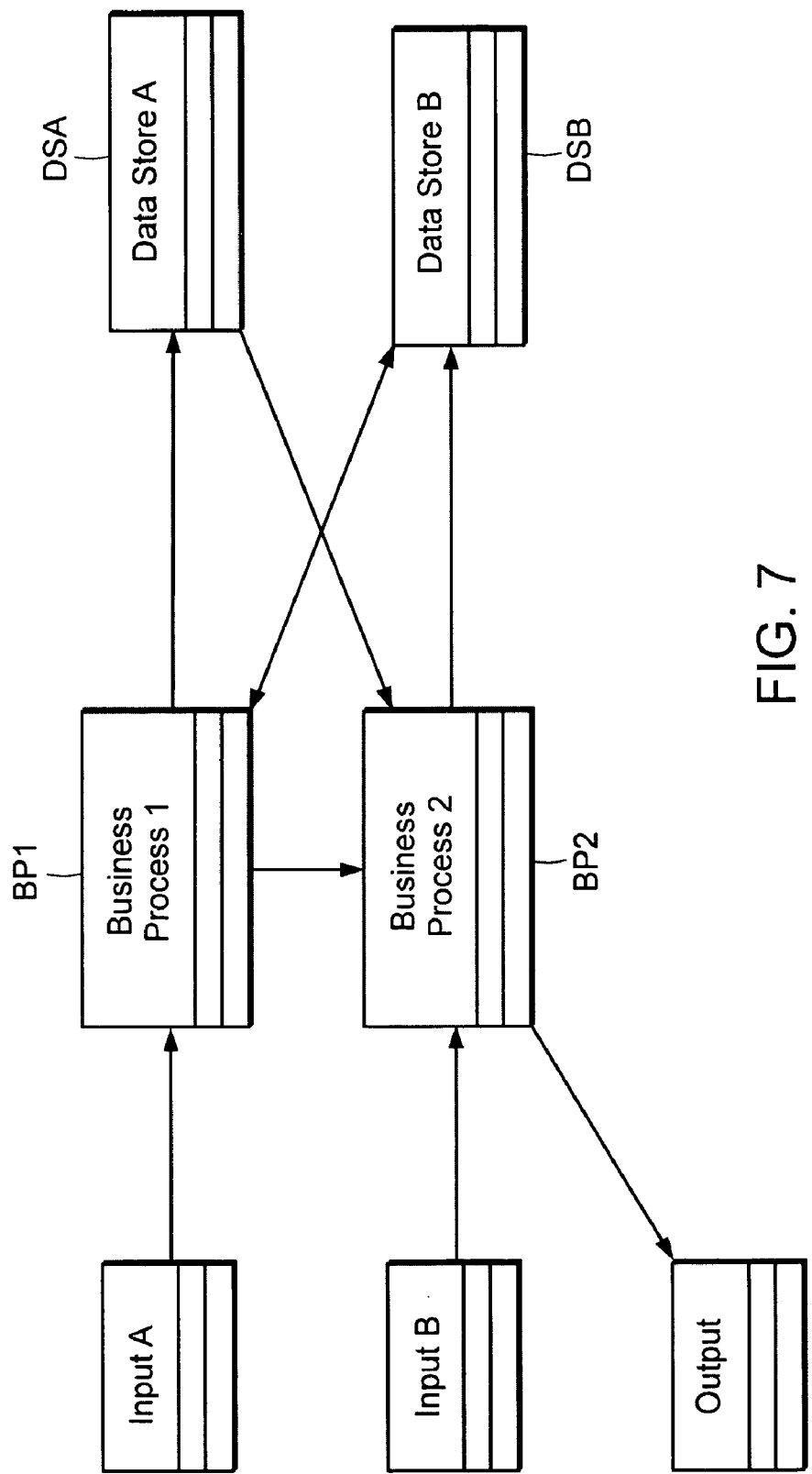
FIG. 7 is a diagram illustrating a conceptual business process design according to one embodiment of the present invention.

In more detail with respect to design validation through predictive modeling, FIG. 7 is a diagram illustrating a conceptual business process design according to one embodiment of the present invention. A conceptual business process design includes high level definitions of business components (e.g., business processes, business workload, data stores) and their interactions.

According to one embodiment, the high level definition for a business workload may include (i) workload style (e.g., electronic file transmission, electronic tape transmission, interactive computer I/O, facsimile transmissions, etc.); (ii) arrival rate (i.e., frequency); (iii) destination (e.g., business process or data store); and (iv) size per unit workload. The high level definition for a business process may include (i) interactions with business components; (ii) the order in which the interactions are executed; (iii) frequency of each interaction; (iv) message sizes initiating each interaction; and (v) interaction style (e.g., unidirectional or bidirectional, serial or parallel, electronic or manual). The high level definition for a data store may include the size of the data store.

Generally, there are not many specifics known about the technical architecture at this phase, if any. Thus, during the predictive modeling phase 260, the application and system layers 70, 80 are populated with standard component models provided by a component library. According to one embodiment, a user interface is provided through which each business component may be mapped to a business application, modeled by one or more software component models in the application layer 70. Each business application, in turn, is mapped to a default hardware operating environment in the system layer 80, which includes a set of hardware and network component models. Thus, the resulting multi-layer predictive model 50 may be used to predict rough estimates of performance metrics, which may be used to determine the viability of the business concept.

For example, the arrival rates of business inputs (e.g., number of transactions per day) and outputs can be fed through the predictive modeling process to derive the response time that would be expected from the business solution, when handling that volume. If the performance metrics indicate that the business solution is able to handle the expected throughput within the required response time, the design of the business concept is viable, warranting additional investment. If performance metrics indicate that the business solution is able to handle the expected throughput, but not within the required response time, then the conceptual business process design may need to be modified. In particular, the predictive model 50 can be used to determine if additional capacity in the form of additional business processes working in parallel may accomplish the given task in a more acceptable window of time. Based on these projections, the cost to deploy the business solution, in a configuration with acceptable response time and throughput, is used to define the business case for the proposed solution, such as how to make it a profitable proposition.

System development iterates between the predictive modeling phase 260 and the business concept design phase 222 until the performance metrics of the business layer 60 either satisfy the business requirements or indicate that the business solution is not viable. If it is determined that the design is not viable, the business concept may need to be re-designed or discarded. Thus, the utilization of predictive modeling at this preliminary phase prevents further investment losses.

Figure 8:
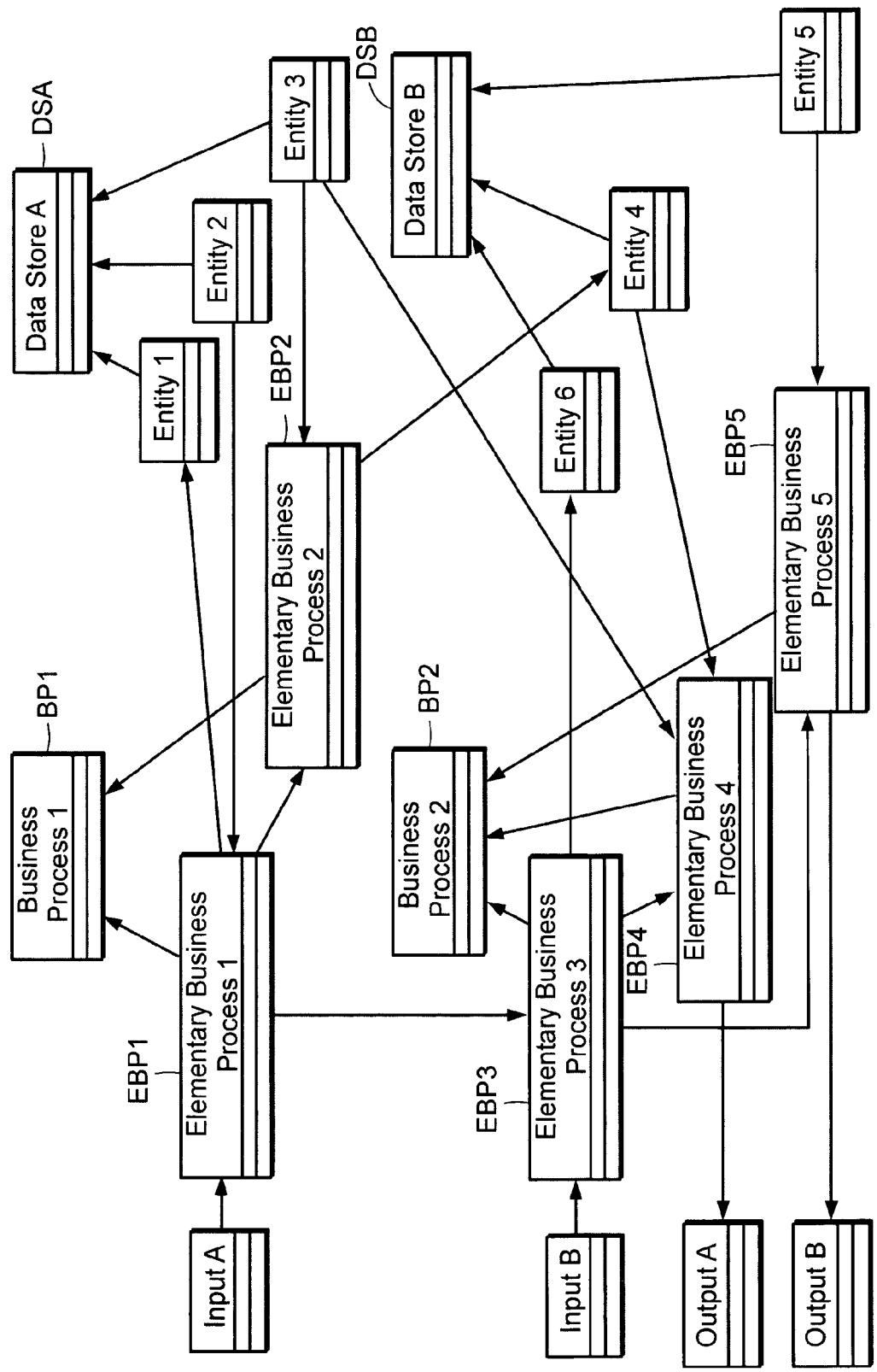
FIG. 8 is a diagram illustrating a refined business process design according to one embodiment of the present invention.

FIG. 8 is a diagram illustrating a refined business process design according to one embodiment of the present invention. During the business refinement design phase, the conceptual business process design, validated from the business concept design phase 222, is the basis for a refined business process design, providing an additional level of granularity to the definitions of the conceptual business process design.

In particular, general business processes are broken out into elementary business processes allowing for specialized processing and avoiding duplication of common processes. Data stores are further defined, identifying table entities and their interactions with the elementary business processes. Business workloads may be newly defined or redefined according to the refined business process design. Referring to FIG. 8, business process BP1 is replaced by two elementary business processes, EBP1 and EBP2; Data Store A is further defined describing three table entities (i.e. FIG. 8, Entity 1; Entity 2; Entity 3); and business workload Output is broken out into two outputs, Output A and Output B (FIG. 8). Furthermore, interactions between the business components may be added or redefined according to the refined business process design.

According to one embodiment, the definitions for the business components are similar to those defined during the business concept design phase 222, with the exception that the definitions may be more accurate at this phase. However, the definition of a data store may additionally include the identity, size, and depth of table entities and usage.

Generally, there are not many specifics known about the technical architecture at this phase, if any. Thus, during the predictive modeling phase 260, the application and system layers 70, 80 are populated with standard component models provided by a component library as previously described in connection with conceptual business process designs.

However, according to one embodiment, the predictive performance may be computed across specific target platforms modeled through system component models in the system layer 80 to allow capacity planning for all components of the system and to refine the business costs, cash flow/capital outlays to be projected. Thus, the resulting multi-layer predictive model may be used to project rough estimates of performance metrics, which may be used to determine the viability of the refined business processes.

Due to the increased complexity of the refined business process design, conflicts, contentions, and locks may emerge among elementary business processes utilizing the same resources. The performance metrics 125 calculated from the predictive model 50 may indicate such conflicts with increased business response times, which are caused by delays associated with the conflicts. As with the business concept design phase 222, the performance metrics may be utilized to isolate and remedy the origin of such conflicts, contentions, and locks.

System development iterates between the predictive modeling phase 260 and the business refinement design phase 224 until the performance metrics 125 of the business layer 60 either satisfy the business requirements 115 or the business solution is determined to be not viable. This is illustrated as accuracy evaluation 140 in FIG. 4.

Figure 9B:
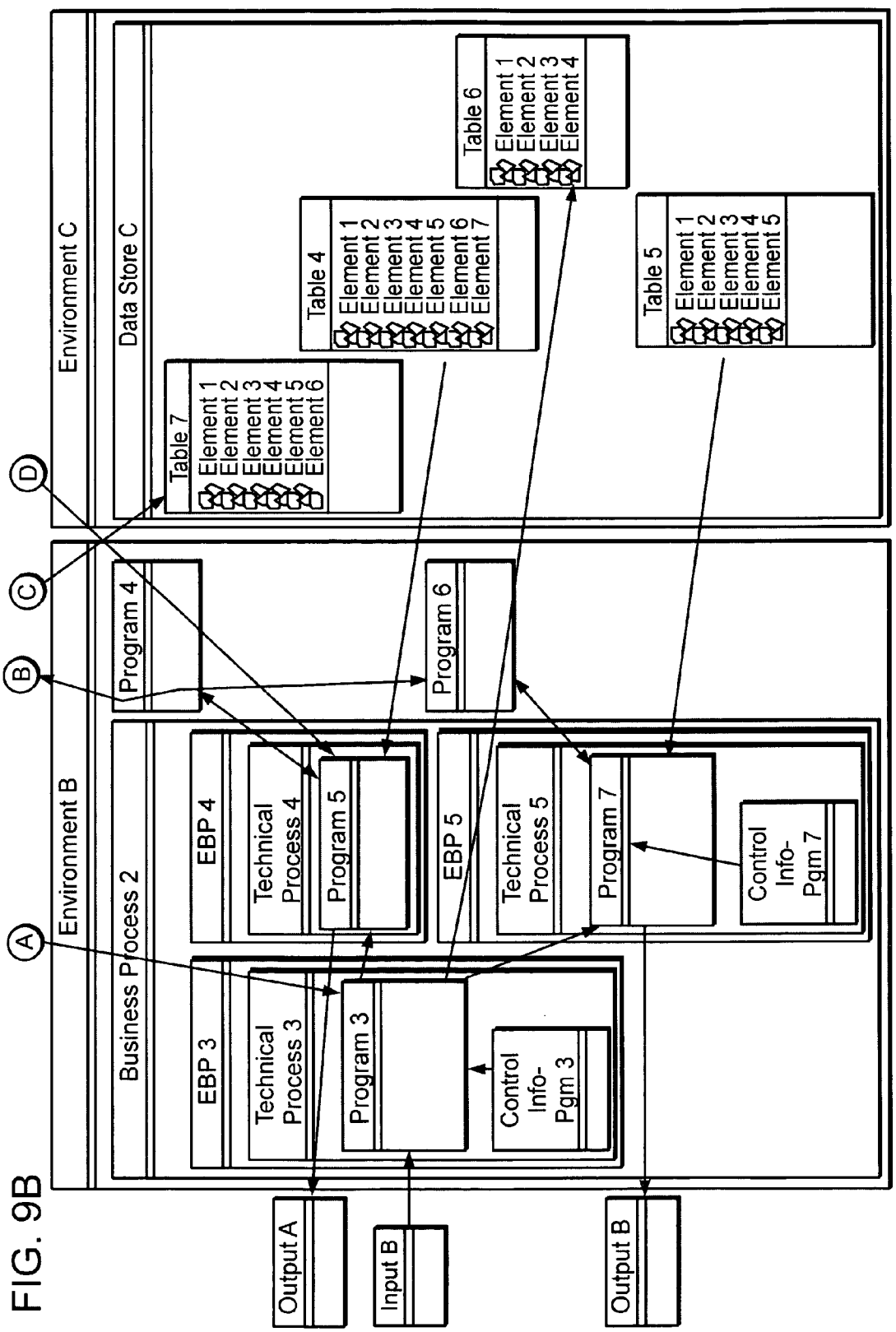

FIG. 9 is a diagram illustrating a technical architecture design according to one embodiment of the present invention. During the technical architecture design phase 230, the business process design, validated from the business refinement design phase 224, is the basis for formulating a proposed design for the technical architecture design of an information system. A technical architecture design includes definitions of both hardware and software components (e.g., technical processes, application programs, control data, hardware operating environments) and their interactions.

The technical architecture design breaks down the elementary business processes of FIG. 8 into descriptions of technical processes, representing business applications. Each technical process is further decomposed with definitions describing software programs that implement the individual functionality provided by the technical process. Control data may be provided to the software programs through data files or more sophisticated data registries. The actual sizes for message flows between these programs, their frequency, and style (e.g., message-based transfer) may be described. Descriptions of the programs may include code or pseudo code segments that may be utilized during one or more of the construction phases.

Thus, during the predictive modeling phase 260 at this juncture, the application and system layers 70, 80 are populated with either standard or customized component models. According to one embodiment, the construction module 48 may either propose a standard component model from the component library or guide the user through additional configuration screens to generate a customized component model. Thus, the resulting multi-layer predictive model 50 may be used to predict accurate values of performance metrics, which may be used to determine the viability as well as actual characteristics and behavior of the information system.

For example, through predictive modeling, the maximum business arrival rate that the solution can support is known as well as the response time that can be achieved. Predictive modeling may also be utilized to determine the location of system bottlenecks and the threshold at which each component reaches full capacity or performance limit. This information can lead to reconfiguration options that will allow the system to be further scaled.

Turning to the one or more construction phases 240 of FIG. 5, each construction phase 240 may result in prototypes of at least a portion of an information system constructed from a validated design. By validating the implementation of the prototypes through predictive modeling, the resulting system can be deployed with reasonable confidence that it will perform as expected. Furthermore, by comparing these estimates with measured results in the test environment, weaknesses within the operating environment may be derived. Thus, preventative or corrective action may be taken in anticipation of components not running as efficiently as they should. Refinement of the physical solution with the model allows the business to have optimal performance from the solution, yielding the best cost/performance ratio for the solution and the best return on investment.

Figure 10B:
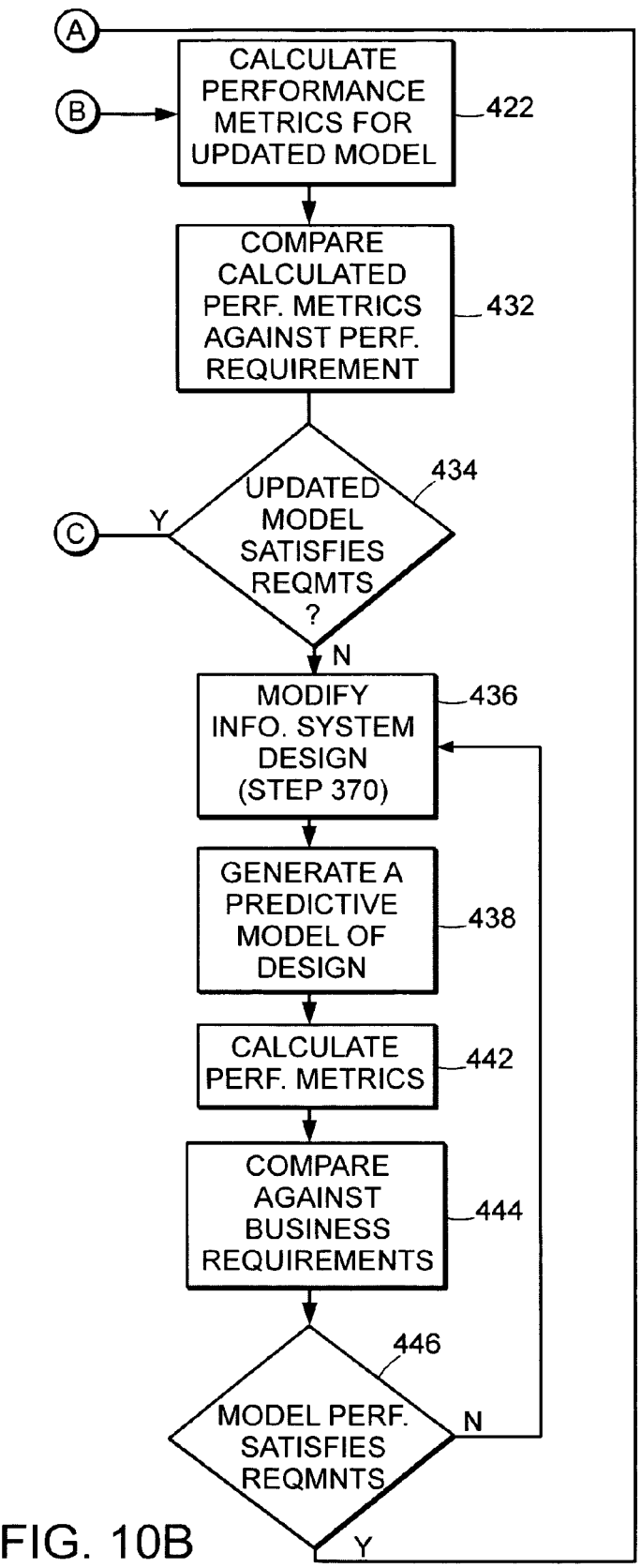
FIG. 10 is a flow diagram of a process for validating a prototype of an information system from a construction phase according to one embodiment of the present invention.

FIG. 10 is a flow diagram of a process for validating a prototype of an information system from a construction phase 240 according to one embodiment of the present invention. In FIG. 4, this is referred to as a stability assessment 150 for prototypes of portions of the information system and a representative assessment 160 for prototypes of the entire information system.

At 410, a prototype of at least a portion of the information system is constructed from a validated design, typically resulting from the technical architecture design phase 230. Physical construction often modifies some specifics in a design in which components are substituted due to unavailability, nonconformance to published specifications, expense, or undesirable latent characteristics and behavior.

At 420, the predictive model 50 of the validated design is updated with changes or substitutions incorporated during the construction of a prototype. In particular, components within the predictive model are substituted for other standard or customized component models.

At 430, individual or group performance metrics 125 are calculated from the predictive model 50 for different kinds and/or volume of workload.

At 440 actual performance metrics are obtained from testing the prototype in response to different kinds and/or volume of workload.

At 450, the actual performance metrics are compared against the modeled performance metrics 125 to verify that the prototype conforms to the predictive model 50.

If, at 460, the actual performance metrics match the modeled performance metrics 125 within a predefined threshold, the implementation of the prototype conforms to the predictive model 50 and the process may proceed to a next development phase at 470. Alternatively, if, at 460, the actual performance metrics do not match the modeled performance metrics 125, then the prototype implementation does not conform to the predictive model and the process proceeds to 480 where the implementation of the prototype is reevaluated and modified. Thereafter, the modified/revised prototype is validated by reiterating through steps 420, 430, 440, 450, and 460.

Finally, the system may be deployed with confidence that it will perform as expected. The system may be further monitored in production for information to add to the predictive model 50, thus, providing early warning of changes in performance, throughput scalability, or capacity requirements. If the implementation of a prototype is not validated, adjustments may be made to the implementation to guarantee performance prior to deployment of the system in an operational environment.

Embodiments of the invention also relate to improving the accuracy of predictive modeling of an information system. According to one embodiment, a system and method is disclosed for improving the accuracy of predictive modeling of an information system by modeling a dynamic representation of the business solution. According to a another embodiment, a system and method is disclosed for improving the accuracy of predictive modeling of an information system through automated calibration of a predictive model 50 against predefined performance benchmarks.

As previously discussed, a business solution involves interactions among a number of business processes and business functions. Application and system components, in turn, support the business processes and functions. The business layer 60 provides workload parameters which are injected into the system of equations 120 that represents the application and system layers 70, 80, while the probabilities of dynamic characteristics and behavior in the application and system layers 70, 80 are used to generate performance metrics 125 associated with the business layer 60. However, in prior art systems, the business layer 60 itself did not express dynamic characteristics and behavior of the business components and their interactions. Thus, the performance metrics of the business layer were not fully representative of the dynamic nature of the business solution.

Embodiments of the invention provide a system and method for improving the accuracy of predictive modeling. New dynamic business characteristics and drivers in the business layer 60 translate into new dynamic application characteristics and drivers in the application layer 70 for improved accuracy by capturing in more detail the characteristics and drivers of a business organization. The predictive model 50, in turn, converts the dynamic business characteristics and behavior into application and system specific characteristics and drivers. For example, locks in a business process are represented as time-dependent characteristics in the application or component. Thus, a business solution is more accurately reflected in the predictive model 50 of the present invention.

Figure 11:
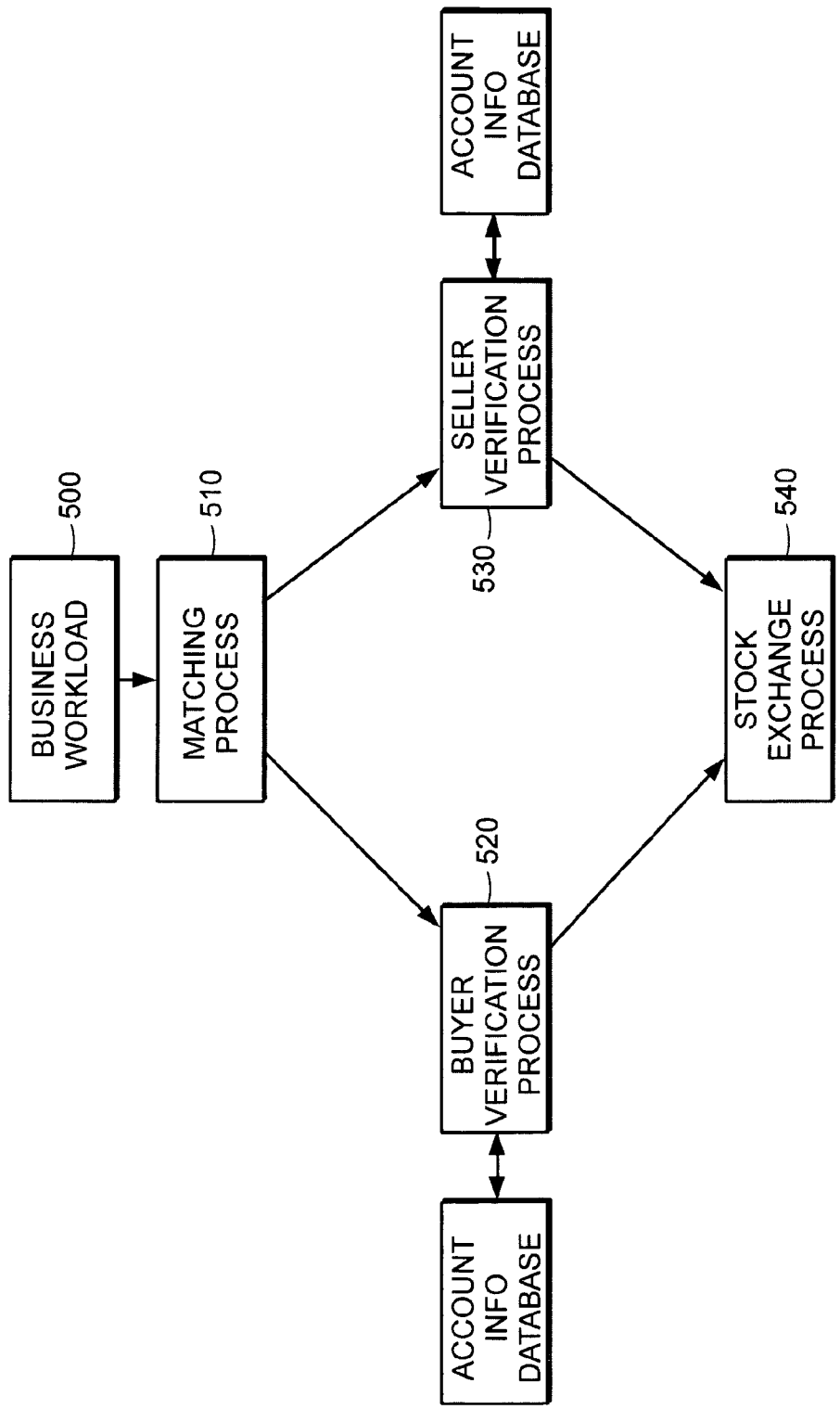
FIG. 11 is a diagram illustrating a prior art representation of a business process design for a stock exchange.

For example, FIG. 11 is a diagram illustrating a prior art representation of a business process design for a stock exchange. The primary business process 510 is a stock matching process through which buyers and sellers trade stock. The matching process 510 includes three subprocesses: a buyer verification process 520, a seller verification process 530, and a stock exchange process 540. Business workload 500 represents the volume of stock transaction requests (e.g., 100 requests).

If the percentage of buyers and sellers is assumed to be 50%, then 50 buyer and 50 seller stock requests proceed to the verification processes 520 and 530. Assuming further that the percentage verified is 100%, 50 buyer and 50 seller stock requests are then forwarded to the stock exchange process 540. In prior systems, the stock exchange process 540 would result in 50 stock transactions being executed within the time required by the technical architecture to process the transactions. In real deployable information systems, however, much less than 50 stock transactions would typically result in the time to process all the stock requests. Some transactions may occur immediately, while other transactions may take much longer.

For instance, if 20% of the buyer stock requests are for stock A and 10% of the seller stock requests are for stock A, there would be 5 stock transactions executed immediately involving stock A with 5 outstanding buyer stock requests waiting to purchase stock A. Thus, even if the system architecture is running efficiently, the business response time is much longer and may indicate that the business process design is not sufficient to satisfy its business requirements.

Figure 12A:
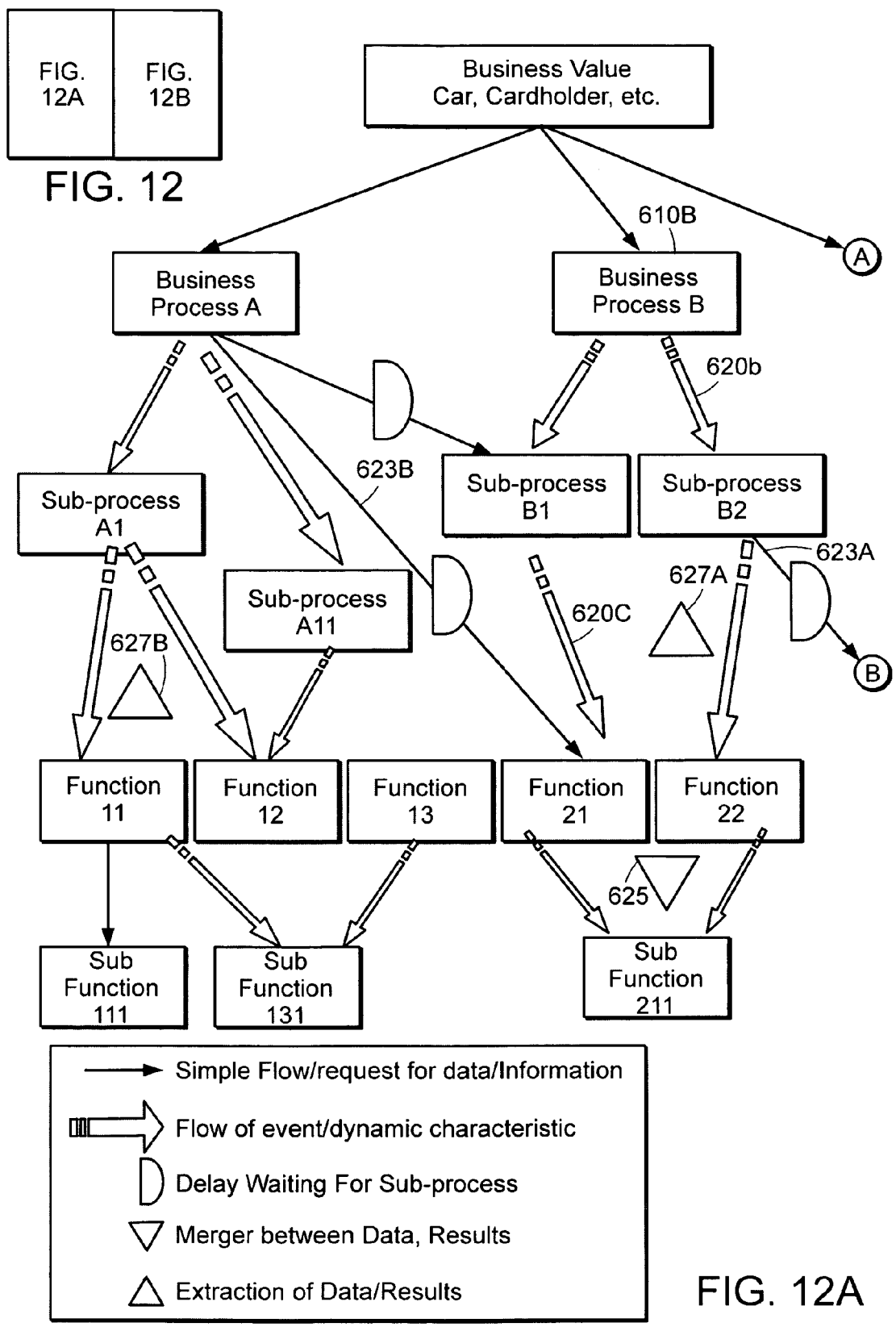
FIGS. 12A and 12B are parts of a diagram illustrating a dynamic business representation of a business solution according to one embodiment of the present invention.
Figure 12B:
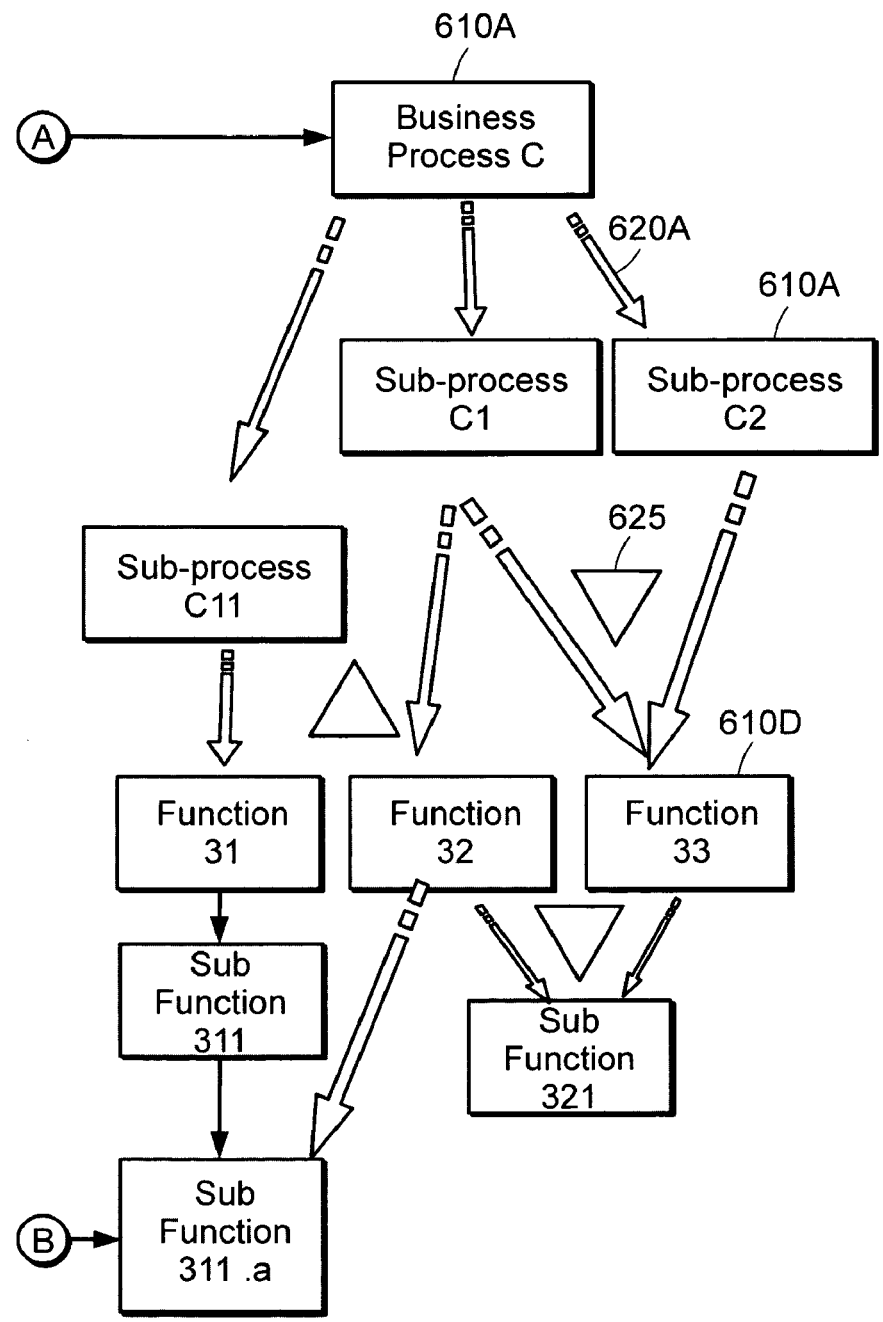

In contrast, FIG. 12 is a diagram illustrating a dynamic business representation of a business solution according to one embodiment of the present invention. With a dynamic representation of a business solution, it may be determined from the performance metrics 125 whether the business solution can actually meet the business needs, regardless of whether the performance metrics of the application and system layers 70, 80 are acceptable.

In generating the dynamic business representation, a description of a business solution is provided describing business components (collectively 610) and the interactions (collectively 620) among them. According to one embodiment, the description includes dynamic drivers for the business processes or functions (sub-processes and sub-functions), such as, but not limited to: (i) number and kind of business events; (ii) probability to perform different sequences of sub-process/sub-functions; (iii) mode of use (e.g., concurrent, sequential, differed, right time, seasonality, regularity/volatility, genericity/specificity, etc.); (iv) weight of an event with respect to others (mix, stability, exception); (v) arrival rates in kind and value; (vi) arrival mechanism; and (vii) mode of chaining and access, which is translated into demands upon the infrastructure layers and services.

From the description of the business solution, a predictive model 50 is generated with the business layer 60 providing a dynamic representation of the business solution. In particular, the business layer 60 models dynamic characteristics and behavior of the business components and the interactions among them in response to dynamic business workloads. According to one embodiment, the business layer 60 models the dynamic behavior and characteristics and the dynamic drivers for business processes, sub-processes, functions, and sub-functions. The dynamic behavior characteristics include, but are not limited to, (i) process or function locks (i.e., waiting for a business event), (ii) the control and management disciplines that guarantee the business events execution and integrity, and (iii) distribution into sub-processes and sub-functions with each representing a stage or step in performing the process or function). The distribution may be horizontal (e.g., concurrent, parallel, or sequential) or vertical (hierarchical chaining with the proper mechanism of connections and accesses that will be delivered from the infrastructure layers). Equation (1) is utilized to calculate the probabilities of the business layer 60 and its components.

Referring to FIG. 12, arrows 620 represent the dynamic characteristics and behavior of an interaction between business components. The interaction may be expressed with its own component model equation, $S_{j,m}$ within equation (1). In prior systems, delays were not modeled in interactions resulting in inaccurate performance metrics requiring manual calibration of the predictive model. According to one embodiment, the dynamic characteristics and behavior expressed in the model equation for an interaction 620 may include one or more probabilities of delays. Such delay may be associated with conflicts, contentions, locks or further processing external to a business component.

With respect to locks, a lock is the dependency of a business process or function on another business process or function, respectively, for processing or information retrieval services. A lock is characterized by a delay representing the duration that a business process or function is locked, waiting for the requested processing and/or information. For example, in a securities exchange, a business function that calculates the cost of a stock transaction may depend on another function to provide real-time stock quotes used in its calculation. The calculation function may be prevented from completing its calculation (i.e., "locked") until the quoting function returns the requested stock quotes.

By identifying locks in the business layer 60, the constituent components of the locks may be identified in the application and system domain and their effects may be modeled as time-dependent characteristics. With the ability to identify locks at the business and application layers 60, 70, an information system designer may be able to consider alternative architectures, which avoid the locking behavior.

As with any business, some business processes/functions rely on input from other processes/functions. Such requests for data/results is not instantaneous. Response times are dependent on a number of factors, such as outstanding requests to the organization or department that provides such information, the amount of processing involved in providing the data/results requested, the applications and system infrastructure implemented to carry out its business process or function. Thus, although not intrinsic to a business process or function, communication exchanges between business processes and business functions can affect performance metrics, such as response time and transacted business volume. Examples of such exchanges include information transfers, mergers, and extraction. Modeling of such exchanges provides a more accurate representation of the dynamics within the business management domain.

Continuing with FIG. 12, information transfers 623 between business processes and functions, such as workload transfers, may be effectuated by a number of transmission mediums, such as facsimile, phone, mail delivery, hand delivery, or electronic transmission means (e.g., email). For example, in a securities exchange, the transmission of orders from a brokerage firm to the securities exchange is a typical workload transfer. Some exchanges may additionally require authorization from a customer or supervisor prior to transfer.

Mergers 625 are a particular type of interaction in which two or more interactions are merging content or workload in the same business component. In particular, information mergers typically involve updating information maintained in a storage system, such as a database. For example, a business process in a stock exchange may continuously track changes in stock prices, merging updates into a database of stock quotations by adding, modifying, and deleting stock quotations. According to one embodiment, the dynamic characteristics and behavior of a merger includes a probability of a delay associated with completion of the merger.

Extractions 627 are another type of interaction in which business content is retrieved from a business component, such as a data store. For example, a business function in a stock exchange may request real-time stock quotations, extracting the information from a stock quotation database. Such extractions are not instantaneous and depend on the amount of activity (e.g., data queries) present on the business component. According to one embodiment, an interaction represents an extraction of business content from a business component with the dynamic characteristics and behavior of the extraction including a probability of a delay associated with the extraction.

By modeling inter-process and inter-function exchanges, delays incurred by such exchanges may be identified and modeled at one or more layers of each domain, providing a more accurate representation of the modeled information system.

In another embodiment, the dynamic characteristics and behavior of an interaction between business components may include one or more probabilities of business workload type being processed. In a further embodiment, the dynamic characteristics and behavior of an interaction between business components may include one or more probabilities of an occurrence of one or more business events.

According to one embodiment, the dynamic characteristics and behavior of a business component may differ in response to business workload type or business event. Such differences may include execution sequences of business components. An execution sequence of business components may also be affected by time constraints associated with a business event, such as right time constraints (e.g., event must be processed within 2 hours). Furthermore, execution sequences of business components may also be dependent on locks wherein execution stalls until a particular event occurs.

According to a further embodiment, the business layer 60 models dynamic characteristics and behavior of business components having different modes of operation, such as batch processing, transactional processing, messaging, or query-based processing.

According to one embodiment, the business layer 60 models the distribution of business processes, vertically into information system model (including application layer 70, system layer 80, and data stores) or horizontally into sub-processes, sub-functions, and interactions. In particular, business processes may be horizontally or vertically distributed over a number of business sub-processes in order to maximize usability and reduce complexity. Likewise, business functions may be horizontally or vertically distributed over a number of business sub-functions. Horizontal distribution includes parallel, concurrent, and sequential distributions, while vertical distribution is a hierarchy of linked business sub-processes.

By identifying business process and function distributions in the business management domain, distribution-related constraints may be imposed on the application and system domains. For example, distributions in the business management domain may constrain the application domain, such that groups of software application components are distributed horizontally across one or more servers or vertically into smaller, individual, and differentiated components. Similarly, the system domain may be constrained with respect to the hardware components available to support such distributions (e.g., parallel processors, networked servers).

Thus, embodiments of the invention provide a system and method for improving the accuracy of predictive modeling by generating a predictive model 50 of the information system including a business layer 60 generated from the business solution description that models dynamic characteristics and behavior of the business components and the interactions among them in response to dynamic business workloads, such that a dynamic representation of the business solution results.

Thus, with a dynamic business representation, the performance metrics 125 of the business layer 60 may indicate whether the business solution satisfies a set of business requirements regardless of whether the performance metrics 125 of the application and system layers 70, 80 are acceptable. If the performance metrics 125 from the business layer 60 indicate that the business solution would not satisfy the business requirements, then the business solution needs to be modified adding additional capacity, which, in turn, affects the design of the application and system layers 70, 80.

Figure 13:
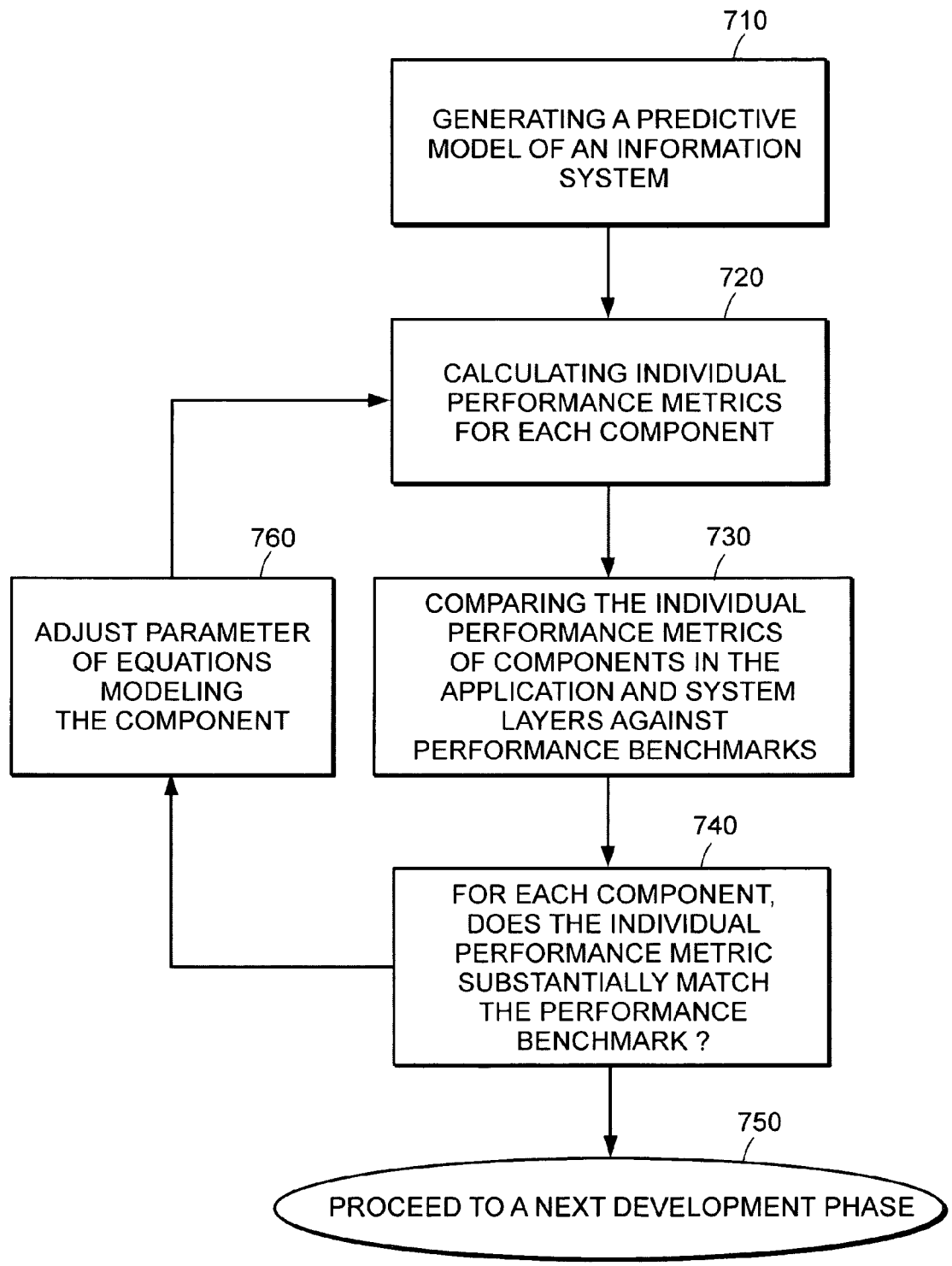
FIG. 13 is a flow diagram of a process for improving the accuracy of predictive modeling according to one embodiment of the present invention.

FIG. 13 is a flow diagram of a process for improving the accuracy of predictive modeling according to one embodiment, referred to as an accuracy evaluation 140 in FIG. 4.

At 710, a predictive model 50 of an information system is provided for an accuracy assessment. The accuracy assessment is typically performed during the predictive modeling phase 260 for a design resulting from the technical architecture design phase 230.

At 720, individual performance metrics 125 are calculated for each component.

At 730, the calculated individual performance metrics 125 are compared against predefined performance benchmarks 115 associated with each component. The performance benchmarks 115 may be provided by the vendor of the component, measured, or observed through component testing.

At 740, for each component, if a calculated performance metric 125 for a component matches the performance benchmark 115 within a predefined threshold (e.g., within 98% of the benchmark), the predictive model 50 of the component is accurate with respect to the performance benchmarks 115 and, thus, proceeds to a next development phase at 750. Alternatively, if the calculated performance metric 125 does not match the performance benchmark 115 within the threshold, the component model might be inaccurate and, thus, the process proceeds to 760 where the component model is calibrated such that it may calculate performance metrics 125 that meet the performance benchmarks 115.

At 760, the parameters of the equation modeling a dynamic characteristic or behavior of the component is adjusted. For example, assume that we have a CPU coupled to four disk drives. The performance metric, processor utilization, has a performance benchmark of 75%. The model input parameters 110 specify that over a one hour period, there should be 10 I/Os per disk. This may result in a processor utilization of 50%, which is not accurate. Thus, the parameters 10 I/Os per disk may be incorrect. Thus, step 760 redistributes the parameters such that there are 20 I/Os to Disk1, 10 I/Os to Disk2 and 5 I/Os per Disk3 and Disk4 (which still provides an average of 10 I/Os per disk). After reevaluating this revised or adjusted model 180, (iterating through steps 720, 730, and 740) the process 140 may find that the processor utilization is now 65%. This sensitivity analysis repeats until a processor utilization that matches the performance benchmark of 75% within a predefined threshold is obtained.

With embodiments of automated calibration of a predictive model 50 against performance benchmarks 115, the predictive model 50 may be utilized as a reference for calculating performance metrics 125 for different volumes and workload types. Thus, the inventive method and system provides a system designer with the ability to predict whether a particular design may scale easily for dynamic changes in business volume and workload.

While this invention has been particularly shown and described with references to preferred embodiments thereof, it will be understood by those skilled in the art that various changes in form and details may be made therein without departing from the scope of the invention encompassed by the appended claims.

What is claimed is:

1. A computer implemented method for developing an information system through multiple development phases, the information system including system architecture, one or more software applications, system hardware and networking components, the method comprising:

at one or more design phases, validating a design of a proposed information system by comparing performance metrics calculated from a predictive model of the design against a set of predefined performance requirements, ensuring that the design satisfies the set of performance requirements at each design phase; and proceeding to a further construction phase if the design is validated;

at one or more construction phases, validating a prototype of at least a portion of the proposed information system described in a validated design by:

a) comparing performance metrics calculated from a predictive model of the validated design against actual performance metrics obtained from the prototype;

b) if the performance metrics calculated from the predictive model of the validated design do not conform to the actual performance metrics obtained from the prototype, varying a workload type and volume selected to be applied to both the predictive model and the prototype;

c) repeating steps a) and b) until the performance metrics calculated from the predictive model of the validated design conform to the actual performance metrics obtained from the prototype.

2. The method of claim 1, further comprising:

modifying the design if the calculated performance metrics do not satisfy the set of performance requirements;

validating the modified design by comparing updated performance metrics calculated from a predictive model of the modified design against the set of performance requirements, ensuring that the modified design satisfies the set of performance requirements; and proceeding to a further development phase if the modified design is validated.

3. The method of claim 2, wherein modifying the design comprises scaling the number or kind of components of the design.

4. The method of claim 1, further comprising:

providing a description of business components and interactions from a business design;

generating a predictive model of the proposed information system design comprising a business layer, an application layer, and a system layer, the business layer being generated from the description of the business components and interactions, the application and system layers being generated by associating each business component in the business layer to default application and system component models; and calculating performance metrics from the business layer to validate the business design.

5. The method of claim 4, wherein the default application and system component models are selected from a Standard component library.

6. The method of claim 1, further comprising:

providing a description of business components, application components, system components, and interactions from a design;

generating a predictive model of the proposed information system design comprising a business layer, an application layer, and a system layer, the business layer being generated from the descriptions of the business components and interaction; the application layer being generated with standard or customized application component models matching the descriptions of the application components and interactions, the system layer being generated with standard or customized system component models matching the descriptions of the system components and interactions; and generating performance metrics from the business, application, and system layers to validate the design.

7. The method of claim 1, further comprising:

performing a cost analysis on the validated design to determine whether to proceed to a further development phase.

8. A method for developing an information system through multiple development phases, the information system including system architecture, one or more software applications, system hardware and networking components, the method comprising:

at one or more construction phases, validating a prototype of at least a portion of a proposed information system constructed from a validated design by:

a) comparing performance metrics calculated from a predictive model of the validated design against actual performance metrics obtained from the prototype;

b) if the performance metrics calculated from the predictive model of the validated design do not conform to the actual performance metrics obtained from the prototype, varying a workload type and volume selected to be applied to both the predictive model and the prototype;

c) repeating steps a) and b) until the performance metrics calculated from the predictive model of the validated design conform to the actual performance metrics obtained from the prototype.

9. The method of claim 8, further comprising:

calculating performance metrics from the predictive model in response to different workload type or volume;

obtaining actual performance metrics from the prototype in response to different workload types or volume; and comparing the actual performance metrics against the calculated performance metrics to verify conformance of the prototype to the predictive model.

10. The method of claim 9, further comprising:

modifying the prototype if the calculated performance metrics do not satisfy a set of performance requirements, wherein modifying the prototype comprises scaling the number or kind of components of the design;

validating the modified design by comparing updated performance metrics calculated from a predictive model of the modified design against the set of performance requirements, ensuring that the modified design satisfies the set of performance requirements; and proceeding to a further development phase if the modified design is validated.

11. The method of claim 9, further comprising:

replacing application or system component models in the predictive model if a component described in the validated design is substituted in the prototype.

12. The method of claim 1, wherein the calculated performance metrics are used to evaluate tradeoffs in maintaining components that implement services for enhancing quality and robustness of the proposed information system, consistent with business or performance requirements.

13. A system for developing an information system through multiple development phases, the information system including system architecture, one or more software applications, system hardware and networking components, the system comprising:

a computer with:

a processor to execute a program of instructions stored in the memory of the computer;

a memory to store a program of instructions for performing a method for developing an information system through multiple development phases;

a display to display results of multiple development phases;

at one or more design phases, a performance metric calculation module calculating performance metrics from a predictive model of a proposed information system design;

a construction module validating the proposed information system design by comparing the calculated performance metrics against a set of predefined performance requirements, ensuring that the design satisfies the set of performance requirements at each design phase; and proceeding to a further construction phase if the design is validated;

at one or more construction phases, the performance metric calculation module calculating performance metrics from a predictive model of a validated information system design;

a prototype of at least a portion of the proposed information system being constructed from the validated design;

the prototype being validated by:

a) comparing performance metrics calculated from the predictive model of the validated design against actual performance metrics obtained from the prototype;

b) if the performance metrics calculated from the predictive model of the validated design do not conform to the actual performance metrics obtained from the prototype, varying a workload type and volume selected to be applied to both the predictive model and the prototype;

c) repeating steps a) and b) until the performance metrics calculated from the predictive model of the validated design conform to the actual performance metrics obtained from the prototype.

14. The system of claim 13, further comprising:

the design being modified if the calculated performance metrics do not satisfy the set of performance requirements;

the performance metric calculation module calculating updated performance metrics from a predictive model of the modified design;

the construction module validating the modified design by comparing the updated performance metrics against the set of performance requirements, ensuring that the modified design satisfies the set of performance requirements; and proceeding to a further development phase if the modified design is validated.

15. The system of claim 14, wherein the design is modified by scaling the number or kind of components of the design.

16. The system of claim 13, further comprising:

an input module providing a description of business components and interactions from a business design to the construction module;

the construction module generating the predictive model of the proposed information system design comprising a business layer, an application layer, and a system layer, the business layer being generated from the description of the business components and interactions, the application and system layers being generated by associating each business component in the business layer to default application and system component models; and the performance metric calculation module calculating performance metrics from the business layer to validate the business design.

17. The system of claim 16, wherein the default application and system component models are selected from a standard component library.

18. The system of claim 13, further comprising:

an input module providing a description of business components, application components, system components, and interactions from an information system design to the construction module;

the construction module generating a predictive model of the proposed information system design comprising a business layer, an application layer, and a system layer, the business layer being generated from the descriptions of the business components and interactions, the application layer being generated with standard or customized application component models matching the descriptions of the application components and interactions, the system layer being generated with standard or customized system component models matching the descriptions of the system components and interactions; and the performance metric calculation module generating performance metrics from the business, application, and system layers to validate the design.

19. The system of claim 13, further comprising: a cost analysis being performed on the validated design to determine whether to proceed to a further development phase.

20. A system for developing an information system through multiple development phases, the information system including system architecture, one or more software applications, system hardware and networking components, the system comprising:

at one or more construction phases, a prototype of at least a portion of a proposed information system being constructed from a validated design;

a performance metric calculation module calculating performance metrics from a predictive model of the validated design;

the prototype being validated by:

a) comparing performance metrics calculated from the predictive model of the validated design against actual performance metrics obtained from the prototype;

b) if the performance metrics calculated from the predictive model of the validated design do not conform to the actual performance metrics obtained from the prototype, varying a workload type and volume selected to be applied to both the predictive model and the prototype;

c) repeating steps a) and b) until the performance metrics calculated from the predictive model of the validated design conform to the actual performance metrics obtained from the prototype.

21. The system of claim 20, further comprising:

the performance metric calculation module calculating performance metrics from the predictive model in response to different workload type or volume;

actual performance metrics from the prototype being obtained in response to different workload types or volume; and the actual performance metrics being compared against the calculated performance metrics to verify conformance of the prototype to the predictive model.

22. The system of claim 21, further comprising:
the prototype being modified if the calculated performance metrics do not satisfy a set of performance requirements, wherein modifying the prototype comprises scaling the number or kind of components of the design;
validating the modified design by comparing updated performance metrics calculated from a predictive model of the modified design against the set of performance requirements, ensuring that the modified design satisfies the set of performance requirements; and
proceeding to a further development phase if the modified design is validated.

23. The system of claim 20, further comprising:
application or system component models in the predictive model being replaced if a component described in the validated design is substituted in the prototype.

24. The system of claim 13, wherein the calculated performance metrics are used to evaluate tradeoffs in maintaining components that implement services for enhancing quality and robustness of the proposed information system, consistent with business or performance requirements.

* * * * *